(12) United States Patent
Cassod et al.

(10) Patent No.: US 7,724,684 B2
(45) Date of Patent: May 25, 2010

(54) SYSTEM AND METHOD FOR DESIGNING AND IMPLEMENTING PACKET PROCESSING PRODUCTS

(75) Inventors: Vispi Cassod, Shrewsbury Township, NJ (US); Anthony Dalleggio, Holmdel, NJ (US); Amine Kandalaft, Holmdel, NJ (US)

(73) Assignee: Modelware, Inc., Red Bank, NJ (US)

( * ) Notice: Subject to any disclaimer, the term of this patent is extended or adjusted under 35 U.S.C. 154(b) by 313 days.

(21) Appl. No.: 11/805,702

(22) Filed: May 24, 2007

(65) Prior Publication Data

US 2008/0291917 A1 Nov. 27, 2008

(51) Int. Cl.
*H04J 1/16* (2006.01)
*H04L 12/56* (2006.01)

(52) U.S. Cl. .............. 370/252; 370/238; 370/254; 370/389; 716/16; 716/17; 717/135

(58) Field of Classification Search ........... 370/238, 370/239, 254, 389, 252; 716/16, 17; 717/135
See application file for complete search history.

(56) References Cited

U.S. PATENT DOCUMENTS

| | | | |
|---|---|---|---|
| 5,228,083 A | 7/1993 | Lozowick et al. | 380/9 |
| 5,235,644 A | 8/1993 | Gupta et al. | 380/48 |
| 5,390,041 A | 2/1995 | Knecht et al. | 359/158 |
| 5,414,650 A | 5/1995 | Hekhuis | 364/715.02 |
| 5,420,583 A | 5/1995 | Knecht | 341/59 |
| 5,500,860 A | 3/1996 | Perlman et al. | 370/85.13 |
| 5,708,689 A | 1/1998 | Shin | 377/75 |
| 5,771,075 A | 6/1998 | Rim et al. | 348/512 |
| 5,796,740 A | 8/1998 | Perlman et al. | 370/401 |
| 5,809,334 A | 9/1998 | Galdun et al. | 395/842 |
| 5,841,472 A | 11/1998 | Rim et al. | 348/390 |

(Continued)

OTHER PUBLICATIONS

PCT International Search Report mailed Jan. 15, 2008, in connection with International Application No. PCT/US07/12583.

(Continued)

*Primary Examiner*—John Pezzlo
(74) *Attorney, Agent, or Firm*—McCarter & English, LLP

(57) ABSTRACT

A system and method for allowing a user to create instructions for building a packet processing integrated circuit. The system includes a user interface for allowing a user to define a desired packet processing algorithm (4) using a plurality of discrete packet processing blocks (22, 24, 28, 30), each of the blocks corresponding to a portion of the desired packet processing algorithm (4). The system allows the user to define connections (10) between the plurality of packet processing blocks (22, 24, 28, 30). The system processes a plurality of packet processing blocks (22, 24, 28, 30) and the connections to provide a list of instructions in a hardware description language for producing an integrated circuit capable of executing the desired packet processing algorithm (19). The list of instructions can be delivered to a customer (12), or the customer can receive an integrated circuit constructed using the list of instructions (19), or the customer can receive a NETLIST generated using said list of instructions (16). The plurality of packet processing blocks (22, 24, 28, 30) can include a Packet Processing Unit (PPU, PPUX) 22, a Packet Modification Unit (PMU) 28, and a Decision and Forwarding Unit (DFU) 30.

59 Claims, 9 Drawing Sheets

U.S. PATENT DOCUMENTS

| | | | |
|---|---|---|---|
| 5,917,821 A | 6/1999 | Gobuyan et al. | 370/392 |
| 5,945,933 A | 8/1999 | Kalkstein | 341/63 |
| 6,157,955 A | 12/2000 | Narad et al. | 709/228 |
| 6,278,838 B1 | 8/2001 | Mendenhall et al. | 386/125 |
| 6,282,575 B1 | 8/2001 | Lin et al. | 709/244 |
| 6,304,553 B1 | 10/2001 | Gehman et al. | 370/235 |
| 6,341,198 B1 | 1/2002 | Mendenhall et al. | 386/98 |
| 6,356,951 B1 | 3/2002 | Gentry, Jr. | 709/250 |
| 6,369,855 B1 | 4/2002 | Chauvel et al. | 348/423.1 |
| 6,401,117 B1 | 6/2002 | Narad et al. | 709/223 |
| 6,421,730 B1 | 7/2002 | Narad et al. | 709/236 |
| 6,449,656 B1 | 9/2002 | Elzur et al. | 709/236 |
| 6,459,698 B1 | 10/2002 | Acharya | 370/392 |
| 6,473,129 B1 | 10/2002 | Choi | 348/465 |
| 6,496,862 B1 | 12/2002 | Akatsu et al. | 709/224 |
| 6,526,066 B1 | 2/2003 | Weaver | 370/465 |
| 6,581,108 B1 | 6/2003 | Denison et al. | 709/245 |
| 6,606,301 B1 | 8/2003 | Muller et al. | 370/230 |
| 6,611,524 B2 | 8/2003 | Devanagondi et al. | 370/395.5 |
| 6,618,057 B1 | 9/2003 | Kim | 345/719 |
| 6,625,689 B2 | 9/2003 | Narad et al. | 711/110 |
| 6,629,125 B2 | 9/2003 | Elzur et al. | 709/200 |
| 6,629,141 B2 | 9/2003 | Elzur et al. | 709/224 |
| 6,665,725 B1 | 12/2003 | Dietz et al. | 709/230 |
| 6,683,909 B1 | 1/2004 | Falco | 375/240.24 |
| 6,701,338 B2 | 3/2004 | Narad et al. | 708/525 |
| 6,711,181 B1 | 3/2004 | Xue et al. | 370/504 |
| 6,725,191 B2 | 4/2004 | Mecayten | 704/215 |
| 6,728,265 B1 | 4/2004 | Yavatkar et al. | 370/468 |
| 6,744,697 B2 | 6/2004 | Mitra et al. | 368/46 |
| 6,757,742 B1 | 6/2004 | Viswanath | 709/246 |
| 6,778,534 B1 | 8/2004 | Tal et al. | 370/392 |
| 6,816,989 B2 | 11/2004 | Litt | 714/724 |
| 6,829,219 B1 | 12/2004 | Honda et al. | 370/230 |
| 6,859,841 B2 | 2/2005 | Narad et al. | 709/236 |
| 6,898,729 B2 | 5/2005 | Virolainen et al. | 714/4 |
| 7,509,246 B1 * | 3/2009 | Molson et al. | 703/13 |
| 2002/0010886 A1 | 1/2002 | Tanaka et al. | |
| 2003/0198204 A1 | 10/2003 | Taneja et al. | |
| 2005/0058149 A1 | 3/2005 | Howe | |
| 2006/0039280 A1 | 2/2006 | Anandakumar et al. | |
| 2006/0256719 A1 | 11/2006 | Hsu et al. | |
| 2007/0050603 A1 | 3/2007 | Vorbach et al. | |

OTHER PUBLICATIONS

PCT Written Opinion mailed Jan. 15, 2008, in connection with International Application No. PCT/US07/12583.

* cited by examiner

SYSTEM AND METHOD FOR DESIGNING AND IMPLEMENTING PACKET PROCESSING PRODUCTS

BACKGROUND OF THE INVENTION

1. Field of the Invention

The present invention relates to digital component design and implementation systems and, more particularly, to a system and method for designing and implementing packet processing products.

2. Related Art

Computer-based communications are dominated by the transmission of packets of data. Typically, a packet contains a payload, i.e., a portion of an overall data message, surrounded by a number of header bits or bytes, that are used to insure that the payload is transmitted and received without error. The header bits or bytes can be divided into a number of fields designating commands, responses, packet characteristics, etc. The fields can take on one or more values depending on the particular protocol used. Some protocols are custom-designed, while others, such as asynchronous transfer mode (ATM) or Transmission Control Protocol/Internet Protocol (TCP/IP), are standardized. For any type of protocol, there is a need to extract and examine the header bits or bytes to make decisions as to how to classify a type of packet, where to route the packet, and whether to drop or temporarily store (queue) the packet for future processing. The header must be parsed, bits or bytes examined or processed, and then routing decisions must be made.

Various hardware and software products have, in the past, been developed for designing and implementing products for processing and classifying data packets. In one approach, parsing, decision, and routing functions are implemented in software modules executed by the host processor and memory of the receiving computer. Processing large amounts of data in real time is often slow, since doing so puts a strain on processor resources. A second approach is to use a specialized microprocessor and associated hardware, called a network processing unit (NPU). The NPU provides a programmable interface for programming nearly any type of protocol functionality. However, the ability to program nearly every aspect of a transmission packet protocol burdens an NPU with a large amount of functionality, rendering an NPU both expensive and slow (low data rates). Also, the time needed for a developer to program an NPU may take several hours to days, which can be cost prohibitive. Another approach is to design a customized application specific integrated circuit (ASIC). This approach often wastes large numbers of gates to achieve only limited functionality, and is thus not cost effective. As such, there is a lack of an adequate system or methodology for designing and implementing packet parsing and classification products, wherein such products can be designed and implemented.

Accordingly, what would be desirable, but has not yet been provided, is a system and method for designing and implementing packet processing products which addresses the foregoing limitations.

SUMMARY OF THE INVENTION

The present invention relates to a system and method for designing and implementing packet processing products, wherein a user can create instructions for building a packet processing integrated circuit. The system includes a user interface for allowing a user to define a desired packet processing algorithm by defining a plurality of discrete, packet processing blocks, each of the blocks corresponding to a portion of the desired packet processing algorithm, as well as connections between the plurality of packet processing blocks. The system processes the plurality of packet processing blocks and the connections to provide a list of instructions in a hardware description language for producing an integrated circuit capable of executing the desired packet processing algorithm. The list of instructions can be delivered to a customer, or the customer can be provided with an integrated circuit constructed using the list of instructions. The customer can also be provided with a NETLIST generated using said list of instructions.

The packet processing blocks of the present invention include a Packet Processing Unit (PPU), a Packet Modification Unit (PMU), and a Decision and Forwarding Unit (DFU). The PPU includes functionality for extracting a header of a packet; for pointing to a portion of the header of a predetermined width using a predetermined index of a bit location in the header; for comparing the data represented by the portion of the header with at least one predetermined value; and for declaring a match when the result of the comparison is true. A variation of a PPU, called a PPUX, includes functionality for accessing an external Content-Addressable Memory (CAM) or Random-Access Memory (RAM). The PMU includes functionality for extracting a packet; pointing to a portion of the packet of a predetermined width using a predetermined index of a bit location in the packet; and modifying the portion of the packet. A packet can be modified in one of three ways: deletion, insertion, or overwriting a portion of the packet. The DFU can perform one of drop, queue, and forwarding operations on packets coming from at least one PPU, PPUX, or PMU. The PPU, PPUX, PMU, and DFU can be programmed by an external microprocessor.

Further features and advantages of the invention will appear more clearly on a reading of the detailed description of an exemplary embodiment of the invention, which is given below by way of example only with reference to the accompanying drawings.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Figure 1:
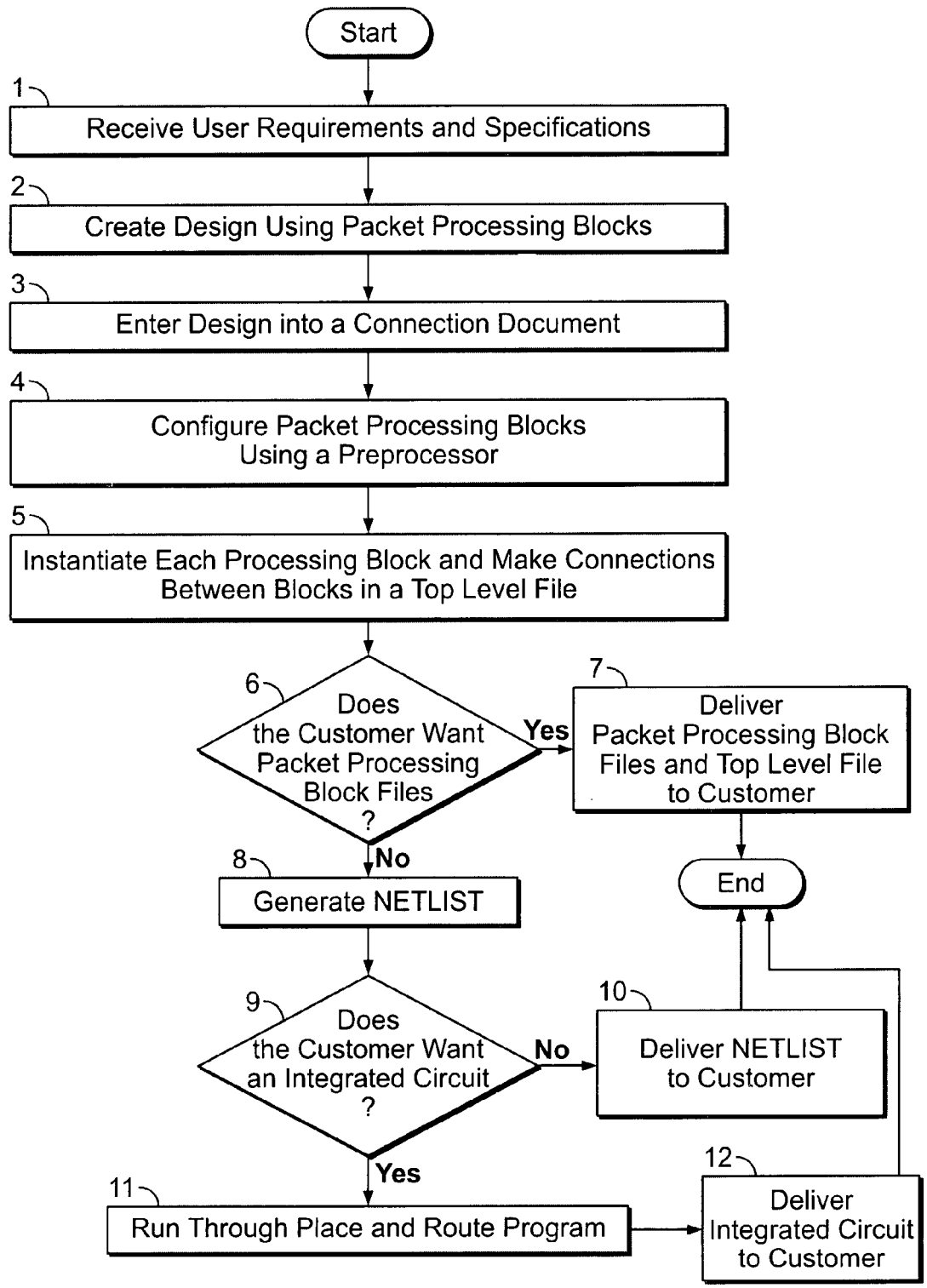
FIG. 1 is a flowchart showing a process according to the present invention for designing a packet processing product.

Referring to FIG. 1, a process according to the present invention for designing packet processing products is shown. The present invention allows a user to design packet processing products using a high-level programming language which generates a NETLIST for generating a hardware design specification of a digital circuit. A NETLIST describes the connectivity of an electronic design. The design process begins at step 1, wherein a set of user requirements and specifications are received, which may be in the form of a packet parsing architecture or a packet parsing and classification algorithm. Typically, these requirements are in the form of a text description of the system to be generated. At step 2, the description is translated by the user or provider into a textual or graphical design using packet processing blocks which include Packet Parsing Units (PPU), Packet Parsing Units with an external interface to a CAM/RAM (PPUX), Packet Modification Units (PMU), and Decision and Forwarding Units (DFU), which will be described hereinbelow with reference to FIGS. 3-7.

As an example of step 2, if the customer needs a firewall that accepts TCP packets and rejects UDP packets, then three PPUs and one DFU are required. One of the PPUs is devoted to determining a source IP address; a second PPU is devoted to extracting a destination IP address; and a third PPU is devoted to distinguishing between TCP and UDP packets. The three PPUs are connected in parallel (since the information can be extracted simultaneously from the same packet), and the "match" outputs of the PPUs (to be described with reference to FIG. 4) and a source packet is forwarded to a DFU. Once the source and destination addresses are extracted from the packet and the type of packet is extracted, the DFU takes each match input and the packet and makes a decision: If the packet is a TCP packet and the source and destination addresses are allowed, then the packet is passed on, otherwise the packet is to be dropped. Thus, in step 2, the user can select the required number and combination of packet processing blocks to be used in the design.

At step 3, the packet processing block requirements, including their required inputs and outputs, are entered into a connection document, which can be a text based EXCEL™ spreadsheet or a VISIO™ block diagram. Typical inputs to the connection document include entries for each PPU and DFU block, which may include an index representing the point of entry into a packet to be processed, and whether a lookup in an internal table of data in a PPU is required.

Once the connection document has been completed, then, at step 4, packet processing blocks, e.g., each PPU and DFU, can be configured. Configuring a packet processing block involves taking a "default" packet processing block file, such as a generic PPU or DFU file, and modifying portions of it and setting variables within each file. Code for the packet processing blocks to be described in FIGS. 4-7 (written in pseudo-code) can be found in Appendices A-E and G-L attached hereto. In particular, the pseudo-code for the PPU calls code found in the following appendices: a file for describing a generic header extraction block called a Hardware Lookup Unit (HLU) (see Appendices D and K), and a file for describing a generic Match/Lookup Unit (MLU) (see Appendices E and L). Both the HLU and MLU will be described hereinbelow as part of the description of the PPU. The packet processing blocks are implemented in a hardware design language (HDL) which models digital circuits, with gates, flip flops, counters, and other logic in a C-like software language. In some implementations, the "pruning" process can be performed by manually copying and editing a maximally configured processing block file, or by applying a preprocessor in the form of shell scripts to cull code from and substitute variables within a maximally configured processing block files. Preprocessing shell scripts, as is known in the art, can include textual or graphically-based user prompts for answering questions about specific parameters desired by the user for a particular block.

Figure 2A:
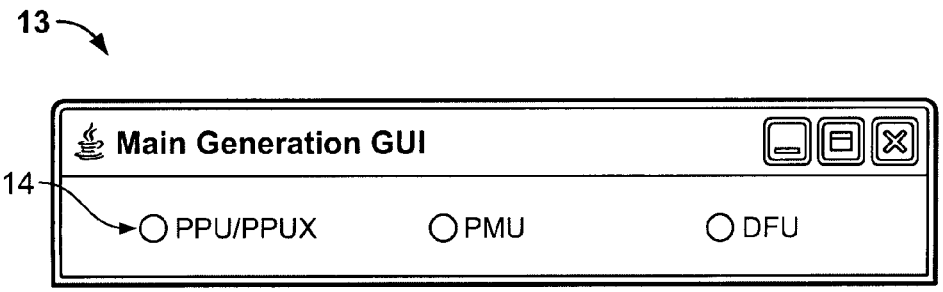
FIG. 2A is a screen shot of a window in a graphical user interface (GUI) according to the present invention for choosing a type of packet processing block to be configured.
Figure 2B:
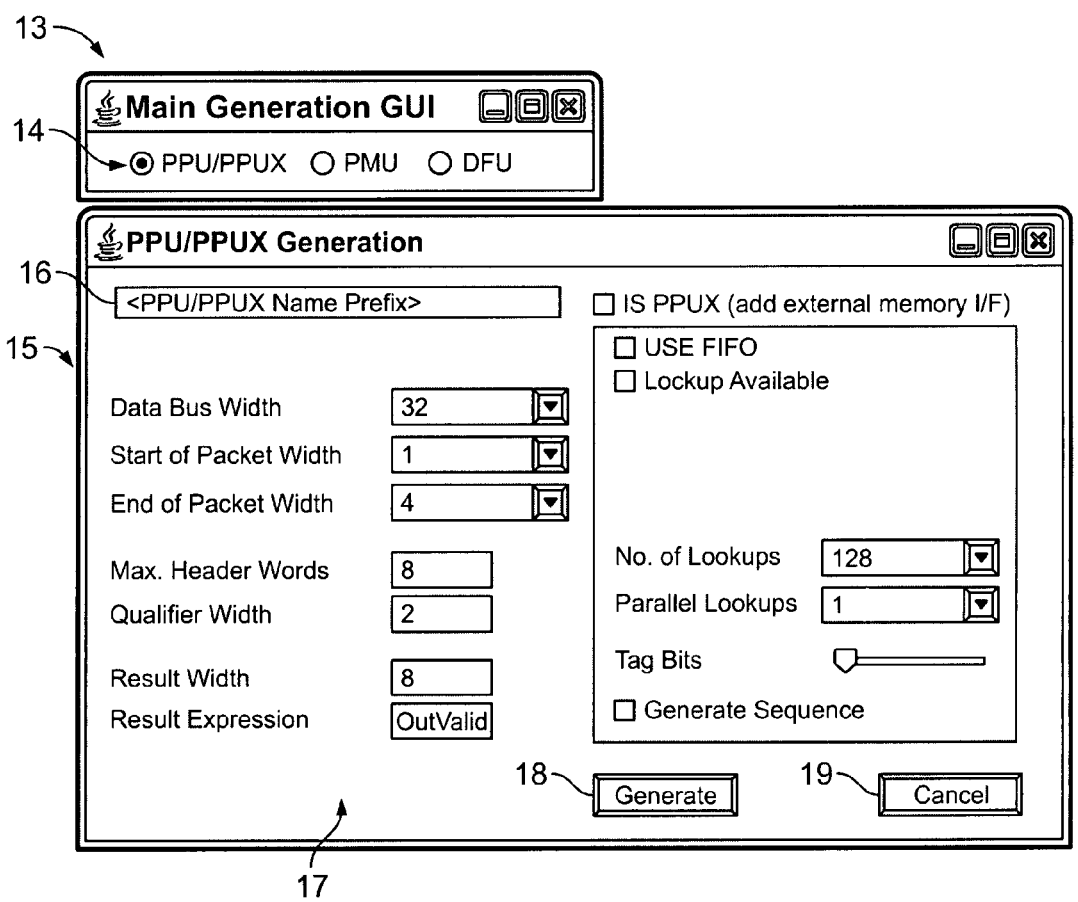
FIG. 2B is a screen shot of a window in a graphical user interface (GUI) for selecting configuration parameters for generating a Packet Processing Unit (PPU) of the present invention.
Figure 2C:
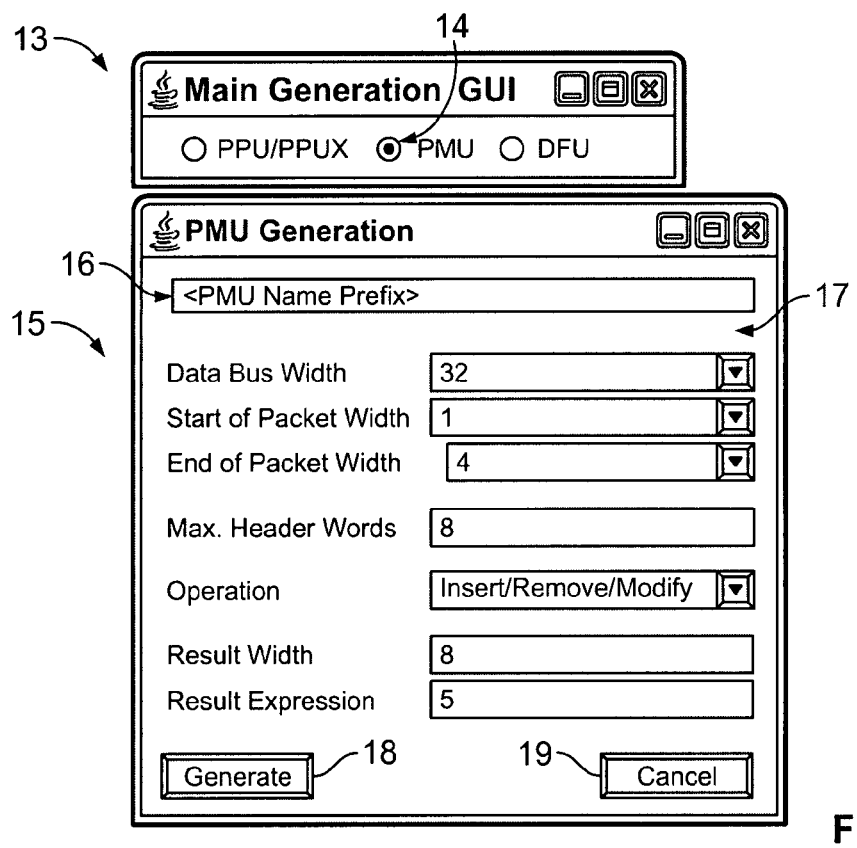
FIG. 2C is a screen shot of a window in a graphical user interface (GUI) for selecting configuration parameters for generating a Packet Modification Unit (PMU) of the present invention.
Figure 2D:
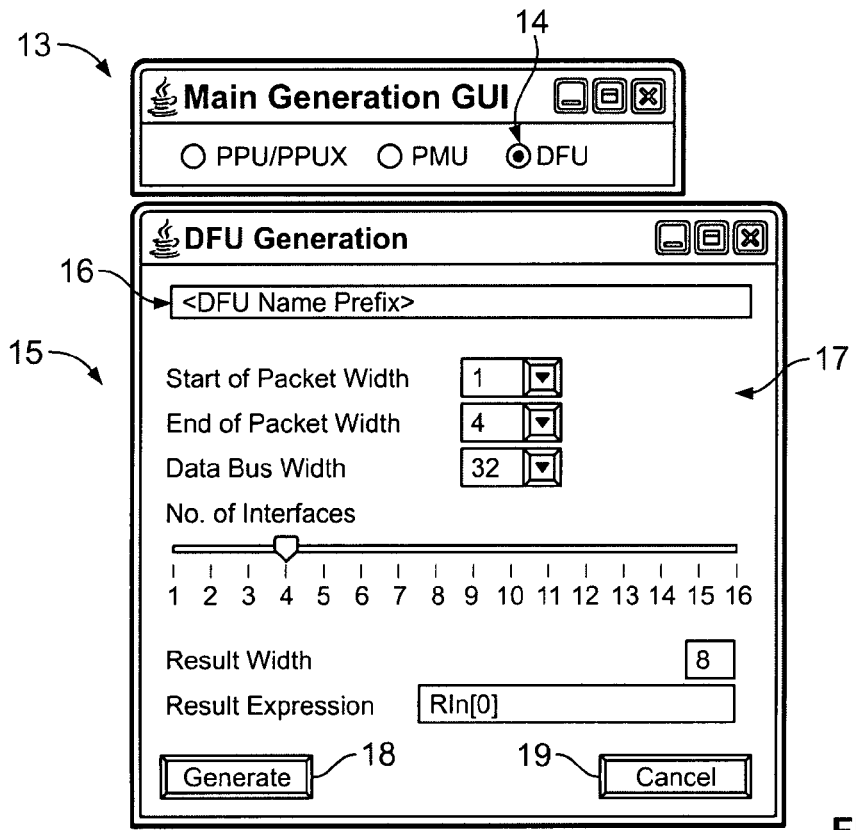
FIG. 2D is a screen shot of a window in a graphical user interface (GUI) according to the present invention for selecting configuration parameters for generating a Decision and Forwarding Unit (DFU) of the present invention.

FIGS. 2A-2D show one possible example of graphical user interface (GUI) which can be used to enter parameters for packet processing blocks. A Main generation GUI window 13 is presented to the user, as shown in FIG. 2A. One of a number of radio buttons 13 is selected by the user to indicate the type of processing block to be configured. Depending on the processing block chosen, a configuration window 15 is displayed, one for each type of processing block (i.e., PPU/PPUX (see FIG. 2B); PMU (see FIG. 2C); and DFU (see FIG. 2D)). Each configuration window 15 contains a field 16 for naming the processing block. A series of configuration screen elements 17 are presented to the user for allowing parameters of each processing block to be specified by the user (including, e.g., data bus width, start of packet width, end of packet width, maximum header words, qualifier width, result width, result expression, external memory parameters, number of interfaces, etc.), and which may vary according each type of processing block. Finally, the user can click on either a "Generate" button 18 to cause the particular processing block code to be generated, or a "Cancel" button 19.

The GUI code can pass the input parameters to a preprocessor, such as a preprocessor called "veriloop2." The pseudo-code for veriloop2 can be found in Appendix F. Veriloop2 first performs substitutions into appropriate variables using the parameters passed from the GUI. Veriloop2 then searches for constructs such as name-value pairs, conditional constructs, and loops having a particular syntax, and then culls the maximally configured packet processing block file to produce a preprocessed header-like library files, each containing a function or class representing a particular PPU, DFU, etc. Pseudo code for types of preprocessor constructs can be found in Appendix G. Pseudo code for sample preprocessed files of FIG. 8 can be found in Appendices H-L. Note that there is only one PPU/MLU/HLU file for all three PPUs, which share the same number of inputs/outputs and share the same general structure. The number of PPUs that need to be generated depends upon the degree of parallelism needed for a particular design. If all the operations for a number of PPUs can be performed in series, then one PPU is needed, since all that changes between instances of PPUs is the input parameters (e.g. opcode, mask, etc.). There is one generated PPU for each parallel operation. There are separate DFU Appendices (i.e., Appendices B, H, and I because each DFU can have a different number of inputs/outputs).

The present invention distils the implementation of maximally configured processing blocks into common sub-blocks which have unique names (e.g., PPU_1, DFU_2) or modules which have inputs and outputs that can be interconnected in such a way as to perform all of the functions necessary for implementing a desired packet processing product. The common blocks described herein are preferably instantiations of packet processing blocks written in VHDL, Verilog, or System C, but other suitable hardware description languages can be used. The software implementation of packet processing blocks is platform independent, and can be written in a platform independent language such as JAVA. As such, packet parser/classifier functionality of the present invention can run both in Windows and in different versions of the Unix operating system, as well as others. In a GUI, the programmer/designer can invoke instances of these common modules using a C-like application programming interface (API) surrounded by other C-like code for interconnecting the sub-blocks.

At step 5, integration is performed. Integration involves declaring instantiations of each processing block by name, and making connections between instantiated packet parsing blocks in a top-level main program file (the top-level main program file is similar to the file containing the main( ) function call in C language). These connections are called "wires" or "signals" which are declared like variables, and associations are made between two processing block instances which have a common wire. For example, signal "x" in PPU1 ties to signal "y" in the top level file. Signal "z" of DFU1 also ties to signal "y" in the top level file. In this way, signal "x" of PPU1 is tied to Signal "z" of DFU1 which may also be tied to one or more other signals. Certain input parameters can also be "hard-coded" within the top-level file.

At this point, all source HDL code has been generated which together can constitute a fully designed product. At step 6, if the customer desires only the design, then at step 7, the generated packet processing block files and the top level file can be delivered to the customer. If the customer desires to have a NETLIST, then at step 8, the generated files are run through a commercially-available synthesis tool, as is known in the art. Sample synthesis tools include Design Compiler from Synopsis, Precision Synthesis from Mentor Graphics, Sinplify from Synplicity, or XST from Xilinx. The synthesis tool behaves like an optimizing compiler which produces a NETLIST for producing an electrical schematic for a custom integrated circuit which is implemented with a minimum number of logic gates, flip-flops, counters, etc. The type of NETLIST generated depends on whether the customer desires to have a foundry-specific device, e.g. a Xilinx FPGA or a generic ("virtual") NETLIST which is not specific to a particular vendor's product. Customers which are EDA (electronic design automation) vendors desire a non-specific NETLIST. The NETLIST could be a foundry-specific or "virtual" bitstream or binary file that is delivered to customer.

At step 9, if the customer does not desire to have a digital integrated circuit delivered to them, then at step 10, the NETLIST is delivered to the customer, otherwise, at step 11, the NETLIST is run through a place and route program, which physically constructs the gates defined in the NETLIST on a silicon die and interconnects them. The choice of a place and route tool depends on whether the packet parser/classifier is to be implemented as an ASIC (fixed logic) or an FPGA (programmable logic). Sample place and route programs include Quartus II from Altera and ISE from Xilinx. At step 12, the integrated circuit is delivered to the customer.

Figure 3:
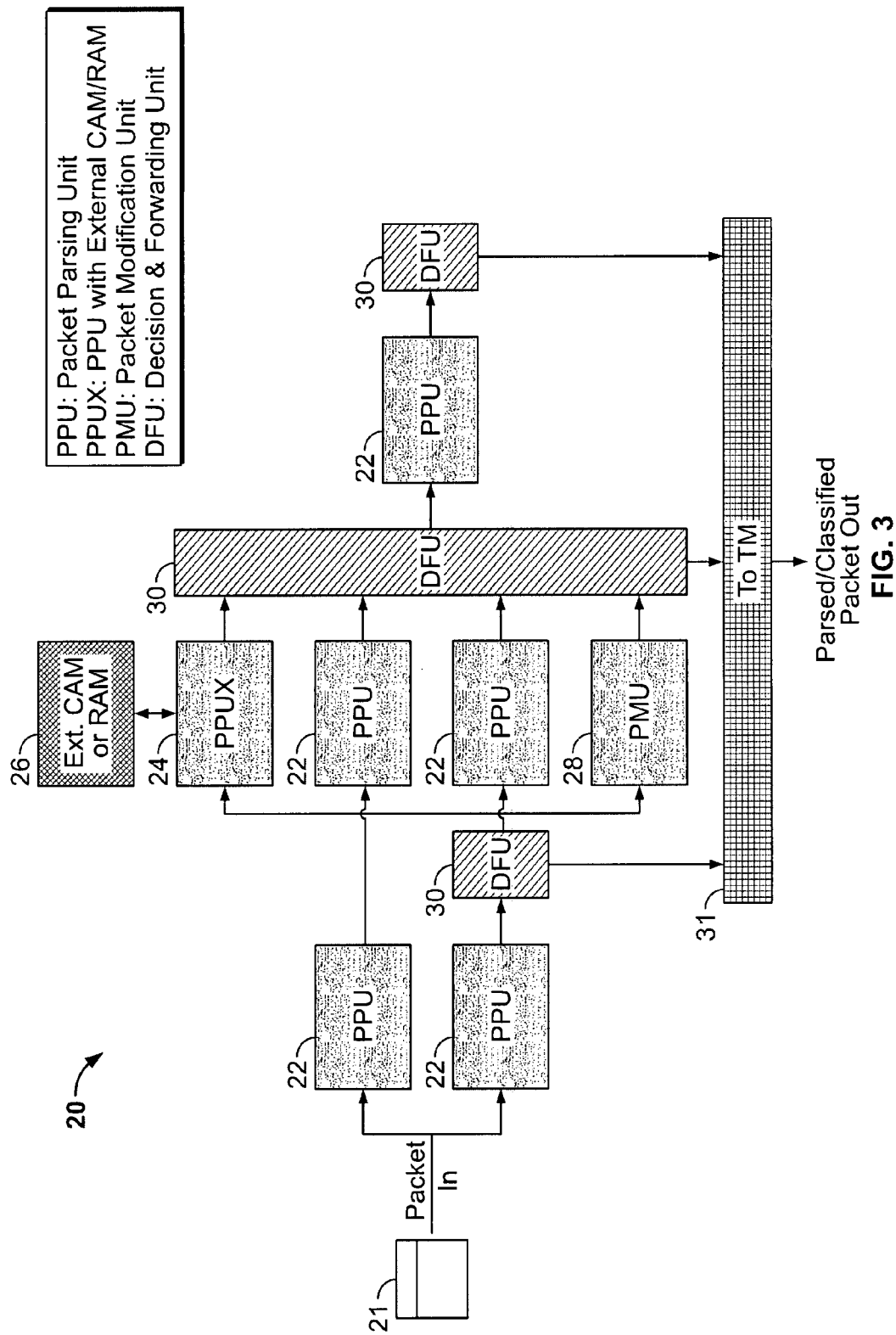
FIG. 3 is a block diagram of a plurality of packet processing blocks according to the present invention for designing a packet processing product.

With reference to FIG. 3, a block diagram of a graphical design environment using packet processing blocks according to the present invention for designing a packet processing product, indicated generally at 20, is depicted. The blocks 20 can be implemented in a text-based or graphical design environment. The environment 20 includes combinations of any number of Packet Parsing Units (PPUs) 22, PPUXs 24 (which are PPUs that can access CAM/RAM memory 26), Packet Modification Units (PMUs) 28, and Decision and Forwarding Units (DFUs) 30. The PPUs 22, PPUXs 24, PMUs 28, and DFUs 30 can be connected by a designer in a variety of ways to create parsing/classification logic for any desired packet processing algorithm. The PPUs 22 operate on packet headers 21. The packet itself can be passed through the environment 20 intact. Alternatively, only the packet header 21 is passed through the environment, which requires the creation and passing of a pointer to the packet data to be output after the DFUs 30. The packets are stored in memory upon arrival and retrieved from memory upon departure. A copy of the header 21 and a pointer to the packet location is passed to the development environment 20. The length of the copied header 21 is variable. It starts at a programmable position in the header 21 and ends at the last field that must be processed. A PPU takes a header 21 and can seek, i.e., locate, any field of constant or variable length. Once the field is found in the header 21, the PPU 22 can perform a check on that field, such as whether the field is equal to or greater than a given value, or matches a particular value, and then output that value depending on the operation performed.

PPUXs 24 are PPUs that can perform lookups or searches using external random-access memories (RAMs) or CAMs (a CAM is defined as a RAM-like memory which can determine whether an input value is present in the memory device). A PMU 28 is a PPU which allows fields in the header of a packet or the packet itself to be modified by means of insertions, deletions, or substitution of bytes. In contrast, the PPUs 22 and PPUXs 24 only allow the fields of a packet header to be examined. Any number of PPUs 22, PPUXs 24, and PMUs 28 can be chained together in series or in parallel to implement complex expressions. The DFUs 30 combine the output of one or more PPUs 22 and/or PPUXs 24 and/or PMUs 28 using a programmable condition, and then forward the header to one of a plurality of outputs. The outputs can represent Boolean True and False values, and decisions as to whether to drop, forward, or queue the packet. The DFUs 30 make decisions to forward, drop, or enqueue packets based on the results from the PPUs 22. For example, the output of the last DFU in the chain, such as the DFU labeled "A", can be a queue ID, i.e. of the queue implemented in an external traffic manager 31.

The traffic manager 31 is a device which performs a set of actions and operations for a network to guarantee the operability of the network. Traffic Management (TM) is exercised in the form of traffic control and flow control. In the context of the present invention, the traffic manager 31 operates on a packet stream once the classification & processing is done on a packet (i.e. once it passes from PPU/DFU blocks). For example, PPU/DFU blocks are used to figure out the priority number of a packet. The traffic manager is given that priority number and the packet to do a traffic control operation to guarantee that high priority packets pass before low priority packets.

Figure 4:
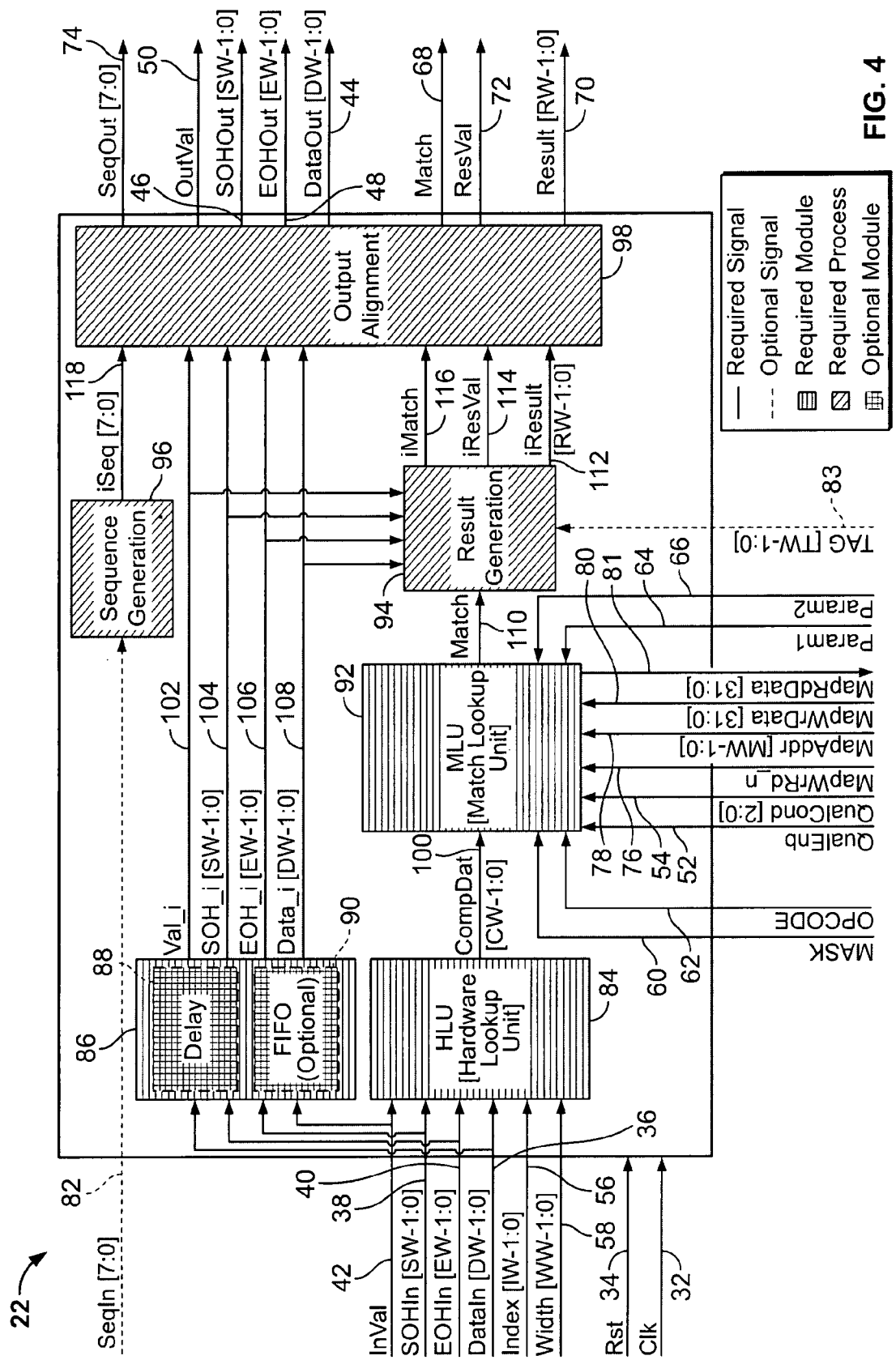
FIG. 4 is a block diagram showing, in greater detail, a Packet Parsing Unit (PPU) of the present invention.

With reference to FIG. 4, a block diagram of the PPU 22 is depicted. The PPU 22 performs basic parsing of the packet header 21 and may perform mathematical/logical operations on the parsed fields of packet header 21. The PPU 22 includes a plurality of inputs and outputs 32-83. The function of each input and output 32-83, as well as the values that each input or output handle, are described with reference to Table 1 hereinbelow.

TABLE 1

| Signal | Ref. # In FIG. 4 | Type (In = Input; Out = Output) | Description |
|---|---|---|---|
| Clk | 32 | In | Clock input |
| Rst | 34 | In | Asynchronous reset (Active high) |
| DataIn | 36 | In | Packet header data input |
| SOHIn | 38 | In | Start of header input (Active High) |
| EOHIn | 40 | In | End of header input (Active High) |
| InVal | 42 | In | Data In valid indication (Active High) |
| DataOut | 44 | Out | Packet header output |
| SOHOut | 46 | Out | Start of header output (Active High) |
| EOHOut | 48 | Out | End of header output (Active High) |
| OutVal | 50 | Out | Data Out valid output (Active High) |
| Qual/Enb | 52 | In | Qualifier/Enable input that is checked using the Qualifier Condition 54 below to enable the PPU 22 on a packet by packet basis. The Qual/Enb 52 can be the Result 70 from a previous PPU. |
| QualCond | 54 | In | Qualifier Condition: The PPU operation is enabled if the result of the check of the Qual/Enb input 52 using the Qualifier condition 54 is true. The Qualifier Condition 54 can be: Always True, Equal, Less Than, Less Than or Equal, Greater Than, Greater Than or Equal, etc.) |
| Index | 56 | In | Index that points to a byte position in the header relative to the start of packet. The first byte in the header has an Index of 0. |
| Width | 58 | In | Width of the field to be operated on |
| Mask | 60 | In | The Mask value is ANDed with the data to be operated on. This allows checking of only certain bits in a data field |
| Opcode | 62 | In | The Opcode specified the operation to be performed. The opcodes are:<br>EQ: Equal to Param1 64<br>LT: Less Than Param1 64<br>LE: Less Than or Equal to Param1 64<br>GT: Greater Than Param1 64<br>GE: Greater Than or Equal to Param1 64<br>RNG: Check if within range <Param1 64, Param2 66><br>LUP: Look up<br>SPCL: Special programmable expression which can use PARAM1 64, PARAM2 66, four special purpose registers provisioned in PPU 12, Index 56, Width 58, and Qualifier/Condition 54. |
| Param1 | 64 | In | Most opcodes use the parameter Param1 |
| Param2 | 66 | In | The RNG opcode uses Param2 to indicate the end of the range |
| Match | 68 | Out | Match is asserted (high) if the result of the operation is true |
| Result | 70 | Out | The Result output is controlled by a logical or arithmetic expression on any of the inputs. For example, to output a Result that drives the Index input 56 of the next PPU so that it points to a data field that is 2 bytes ahead:<br>Result = Index + 2 |
| ResVal | 72 | Out | Indication that Result 70 is valid |
| SeqOut | 74 | Out | Sequence number used for synchronization between PPUs and a DFU. This value increments every packet |
| MapWrRd_n | 76 | In | Map write enable is used to program internal registers. Active high is writing, active low for reading |
| MapAddr | 78 | In | 16 Address locations are provisioned for following usage<br>0x0 = PPU ID<br>0x1 = Qualifier enable condition value<br>0x2 = Address to program internal Lookup table<br>0x3 = Data to program internal Lookup table (Note: The address needs to be written first followed by data)<br>0x4-0x7: Used for special purpose registers which can be used in any equation for the special Operation code<br>0x8-0xF: For future use |
| MapWrData | 80 | In | Write data for the PPU map |
| MapRdData | 81 | Out | Read back data from the PPU map |

TABLE 1-continued

| Signal | Ref. # In FIG. 4 | Type (In = Input; Out = Output) | Description |
|---|---|---|---|
| SeqIn | 82 | In | An optional externally defined sequence number. This may be used in place of an internally generated sequence number for a PPU. |
| TAG | 83 | In | An optional user defined label to be associated with the packet header |

The terms in brackets in FIG. 4 accompanying a specific input or output represents the bit width of the input or output, in standard HDL syntax. For example, if the input DataIn 36 is to be 32 bits wide, then the variable DW is set to 32 such that DataIn 36 is expressed in an HDL file as "DataIn[DW-1:0] =DataIn[32-1:0]=DataIn[31:0]", where "31" represents the last bit and "0" represents the first bit.

The input Clk 32 is supplied from external hardware, such as the clock of a microprocessor. The Input Rst 34 is used to cause the PPU to go into a pre-defined state where most internal variables and outputs are set to an initial value. This condition is usually needed at power-up of the hardware in logic systems to stabilize the system before execution of a packet processing algorithm. The system is initially Reset. A predetermined amount of time later, when it is known that all circuits have stabilized, then the circuit is put into operation by toggling Rst 34.

The PPU 22 includes a Hardware Lookup Unit (HLU) 84, a Delay/FIFO module 86 containing an optional Delay Line 88 or a FIFO 90, a Match and Lookup Unit (MLU) 92, Result Generation (process) 94, Sequence Generation (process) 96, an Output Alignment (process) 98, interconnected as shown. The sub-blocks 84-98 are implemented as modules or processes. A module is similar to a class or subclass in an object-oriented language like C++, while a process is similar to a function. The PPU also contains (not shown) a predetermined but limited number of internal general-purpose registers for storing and retrieving values for comparisons, lookups, etc.

A stream of data is continuously presented to the input DataIn 36 of the HLU 84. No data of the input stream is stored in a memory. In such circumstances, it is the job of the HLU 84 to extract information from a packet and present that information to the other blocks of the PPU 22. The HLU 84 takes a snapshot of the data stream according to the location in the data stream specified by the inputs Index 56 and Width 58. The inputs SOHIn 38, EOHIn 40, and InVal 42 allow for fine tuning of locating data from the output of other PPUs, PPUXs, PMUs, or external hardware. SOHIn 38, EOHIn 40, and InVal 42 tell the PPU 22 how to delimit data a packet header. SOHIn 38 tells the hardware where packet starts and EOHIn 40 tells the hardware when a packet header ends. Once the packet starts, then at every clock cycle, the data presented at DataIn 36 is either valid or invalid, as indicated by the input InVal 42. The extracted header bits are present as an output CompDat 100 and as an input to the MLU 92. CompDat 100 stands for the data that needs to be compared in the MLU 92.

The Delay/FIFO module 86 is used to synchronize the outputs of the PPU 22 to be presented to a subsequent block, such as a DFU. The Delay/FIFO module 86 is needed because the inputs to the PPU, such as DataIn 36, along with the control input signals SOHIn 38, EOHIn 40, and InVal 42, need to be aligned in time in the Output Alignment process 98 with intermediate outputs of other sub-blocks of the PPU 22, such as the Match output 110 of the MLU 92, which may be delayed relative to the inputs due to delays in processing within the MLU 92. The MLU 92 performs its decision making (e.g., a comparison of a bit within DataIn 36 with a user specified parameter (Param1)) without full packet storage. Therefore, DataIn 36 along with the control input signals SOHIn 38, EOHIn 40, and InVal 42 are pipelined to the Result Generation process 94 and the Output Alignment process 98 by way of intermediate I/O Val_i 102, SOH_i 104, EOH_i 106, and Data_i 108. There are fixed delays (measured in clock cycles) associated with processing in the in Result Generation process 94 and the MLU 92. There is a variable delay associated with the HLU 84 depending upon value of Index 56. The inputs described above must be delayed in the Output Alignment process 98 by the sum of the aforementioned individual delays. For example, if Index 56 is 8, then CompDat 100 is received at the MLU 92 eight clock cycles after DataIn 36 arrives at the PPU 22. If the MLU 92 processes CompDat 100 in three clock cycles, then the PPU 22 inputs need to be delayed by 8+3 clock cycles in the Output Alignment process 98. The choice of the optional Delay Line 88 or the FIFO 90 depends on the size of the delay needed. A FIFO always works but requires using scarce memory in the PPU 22. Thus, if only a few clock cycles worth of delay up to about 16 clock cycles are needed, then the Delay Line 88 is used, otherwise the FIFO 90 is used.

The MLU 92 performs the bulk of the packet parsing and classification operation to be performed on one unit of a packet processing algorithm. The MLU 92 is programmable, i.e., it can compare the data/fields extracted in the HLU 84 with values stored in internal registers by means of the inputs Opcode 62, Param1 64, Param2 66, and Mask 68 and declares a match or no match which appears on the internal output Match 110, which, in turn, appears as an output of the Result Generation process 94. The inputs QualEnb 52 and QualCond 54 enable or disable the MLU 92 depending on certain conditions. The operation to be performed in the MLU 92 are enabled if the result of the check of the QualEnb 52 using the QualCond 54 is true. QualEnb 52 is a value stored in a qualEnb register (not shown) which is user programmable through an address map. The Qualifier Condition 44 can be: Always True, Equal, Less Than, Less Than or Equal, Greater Than, Greater Than or Equal, etc.

For example, if the user desires only to allow IPV6 packets, then QualEnb 52 can be programmed through the qualEnb register (not shown) to be the value 6. QualCond 54 is set to Equal To (EQ). The packet type is retrieved from a mode register from an external CPU. If the packet type is 6 (IPV6), then the MLU 92 is enabled; if the packet type is 4 (IPV4), then the MLU 92 is disabled, and no comparison takes place. If it is desired to have all types of IP packets, then QualCond 54 is set to Less Than or Equal (LE) or Always True.

The match/no-match functionality of the MLU 92 is performed on the portion of the DataIn 36 packet header pointed to by Index 56 and Width 58. Additional inputs Mask 60, Opcode input 62, Param1 64, and optionally Param2 66 are needed to perform the comparison/match/no-match operation. The MLU 92 performs a seek and operation function.

The seek function finds a data field in a packet header (not shown) based on an offset from the start of the packet header indicated by the input Index 56. If Index 56 is 0, then the first byte of the packet header is indicated. An Index 56 of six indicates the seventh byte from the beginning of the packet header. The interconnections that can be made to the Index input 56 include a fixed value (e.g. 4), a value stored in an internal user defined control register, or the result output 70 of another PPU, PMU, or DFU. If the Index input 56 is driven from another PPU, PMU, or DFU, the value placed on the Index input 56 is variable, depending on the condition(s) evaluated in the previous PPU, PMU, or DFU.

The operation function performs a check, an extraction, or a lookup on "Data_Field", which is the contents of the packet header pointed to by the Index input 56 of width equal to the value in bits placed on the Width input 58. The general expression of the operation is Op(Data_Field AND Mask, Param1, Param2)

The Data_Field may be filtered (AND'ed) with the Mask input 60. "Op" is one of the opcodes placed on the Opcode input 62 given the Param1 input 64, and optionally the Param2 input 66. The types of operations are shown in Table 2 below:

TABLE 2

| Mnemonic | Parameters | Description |
| --- | --- | --- |
| EQ | Param1 | Equal: Check if the Data field is equal to Param1. |
| LT | Param1 | Less Than |
| LE | Param1 | Less Than or Equal |
| GT | Param1 | Greater Than |
| GE | Param1 | Greater Than or Equal |
| RNG | Param1, Param2 | In Range between Param1 and Param2 |
| LUP | — | Look Up |
| SP | — | Search: or special operation for a PPU using PARAM1, PARAM2, four Special purpose registers provisioned in PPU, Index, Width & Qualifier. |

For example, a single MLU can be programmed to check if an IP address less than 224.XX.XX.XX, by specifying the following values:
Opcode=LT
Param1=224
Index=Points to IP DA or SA and can be adjusted automatically for VLAN tagging using a PPU.

As another example, to point to the beginning of an Ethernet frame payload for both untagged and VLAN tagged frames:
Index=14 (Type/Length)
Opcode: EQ
Param1: 0x8100
QualCond=True
Match (True): Index=20
Match (False): Index=16

The inputs MapWrRd_n 76, MapAddr 78, and MapWrData 80, and the output MapRdData 81 are used as the interface between an external microprocessor and the internal registers of the PPU 22 to allow for reading of and writing to the registers. The PPU 22, PPUX 24, PMU 28, and DFU 30 can contain a user defined number of internal registers for packet header manipulation either internally or via an external microprocessor. The opcodes LUP and SPCL can be used to directly manipulate data in internal registers.

The output Match 110 of the MLU 92 is fed to the input of the Result Generation process 94 to be described hereinbelow. The Match output 110 is True if the operation performed in the MLU 92 is True, or False otherwise. The Result Generation process 94 takes the Match output 110, the outputs of the Delay/FIFO module 86, and optionally a tag value present on TAG 83 and produces the result output iResult 112, which is fed as an input to the Output Alignment process 98 and ultimately is the output Result 70 of the PPU 22. The Result Generation process 94 also outputs iResVal 114, which indicates when iResult 112 is valid. This is needed as a handshaking device, since result generation can take more than a single clock cycle. iMatch 116 is the value of Match 110 passed along from the MLU 92. Assuming the MLU 92 was enabled, iResult 112 can take on two values corresponding to the True or False evaluation of the operation performed in the MLU 92. The True/False result values can be fixed or an arithmetic or logical function of any of the PPU 22 inputs. The iResult output 112 is later passed through the Output Alignment process 98 to be described hereinbelow as Result 70, which can be used to drive a DFU input or any input of another PPU or a PMU. Result 70 can also be a complex expression that the user may want to program. This allows the Index 56, QualEnb 52, Opcode 62, or Param<1,2> 64, 66 inputs of a PPU to be driven with different values depending on the Result 70 output of other PPUs.

The PPU 22 generates or forwards a sequence number using the Sequence Generation process 96. The sequence number can optionally come from an external process/hardware via the input SeqIn 82 and passed along to a DFU; otherwise sequence numbers are internally generated within a PPU 22 using the Sequence Generation process 96. The sequence number, which appears as an internal output iSeq 118, is passed through the Output Alignment process 98 to a DFU through the PPU output SeqOut 74. Sequence numbers are incremented sequentially for each use of a PPU and are used for internal synchronization of all the inputs of a DFU. Sequence numbers are needed because different PPUs can present their output packet header data, match data, and results at different times. For example, one PPU may index at bit 0 of an incoming packet, in which case match output may appear at an input to a DFU after three clock cycles. If another PPU indexes on a VLAN type field, then index is set to block 5 or 6, which gives its results to the same DFU after 6+3 clock cycles. The DFU takes the matches packet headers, and sequence number from each of the PPUs and arranges them in correct sequence to be described hereinafter.

The Output Alignment process 98 aligns all outputs to the start of packet (SOP) or the end of packet (EOP). This is done in order to provide proper delineation of the output signals of one PPU to the next PPU/PPUX/PMU/DFU. For example, if PPU1 is connected to PPU2, and PPU1 operates either on an 802.3 Ethernet frame or an Ethernet type 2 frame, then PPU1 examines a byte field which is either 20 bytes or 40 bytes from the beginning of a packet header. Therefore, all outputs of PPU1 need to be aligned on SOP as a requirement for input to PPU2. As another example, some protocols use trailer insertion, e.g., inserting a checksum at the end of a packet. Therefore, outputs are aligned at EOP.

Figure 5:
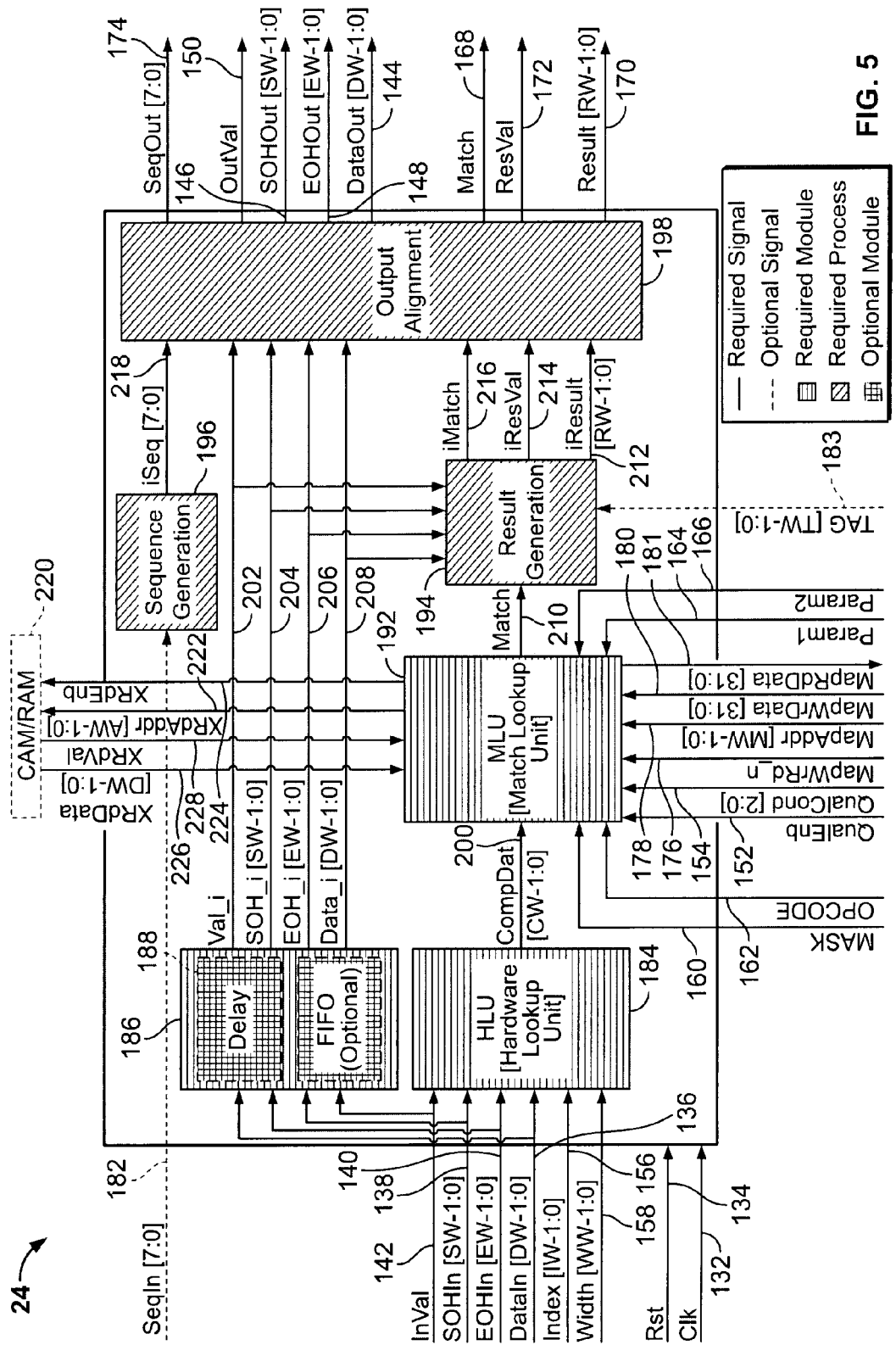
FIG. 5 is a block diagram showing, in greater detail, a Packet Parsing Unit with an external interface to a CAM/RAM (PPUX) of the present invention.

With reference to FIG. 5, a block diagram of a PPUX 24 is depicted. A PPUX 24 has the same I/O signals and sub-blocks as the PPU 22 except for additional I/O needed to access an external CAM/RAM 220. Elements illustrated in FIG. 5 which correspond to the elements described above in connection with the PPU 22 of FIG. 5 have been identified by corresponding reference numbers increased by one hundred. Unless otherwise indicated, both the PPU 22 and the PPUX 24 have the same construction and operation.

In a PPU, as mentioned earlier, there is a predetermined number of internal registers/memory which can be programmed by a user. A typical need for programmed memory is for performing a lookup of values by MLU 192. For example, if there is a need to compare Param1 164 to one hundred IP addresses, then internal memory is used. However, if the number of lookups and hence values to be stored in memory is on the order of thousands of bytes or more, then it may be necessary to store and retrieve these values to/from an external CAM/RAM 220.

TABLE 3

| Signal | Ref. # in FIG. 5 | Type (In = Input; Out = Output) | Description |
|---|---|---|---|
| XRdAddr | 222 | Out | Memory address output |
| XRdEnb | 224 | Out | Read signal (Active High) |
| XRdData | 226 | In | Read data from memory |
| XRdVal | 228 | In | Read data valid input (Active High) |

Figure 6:
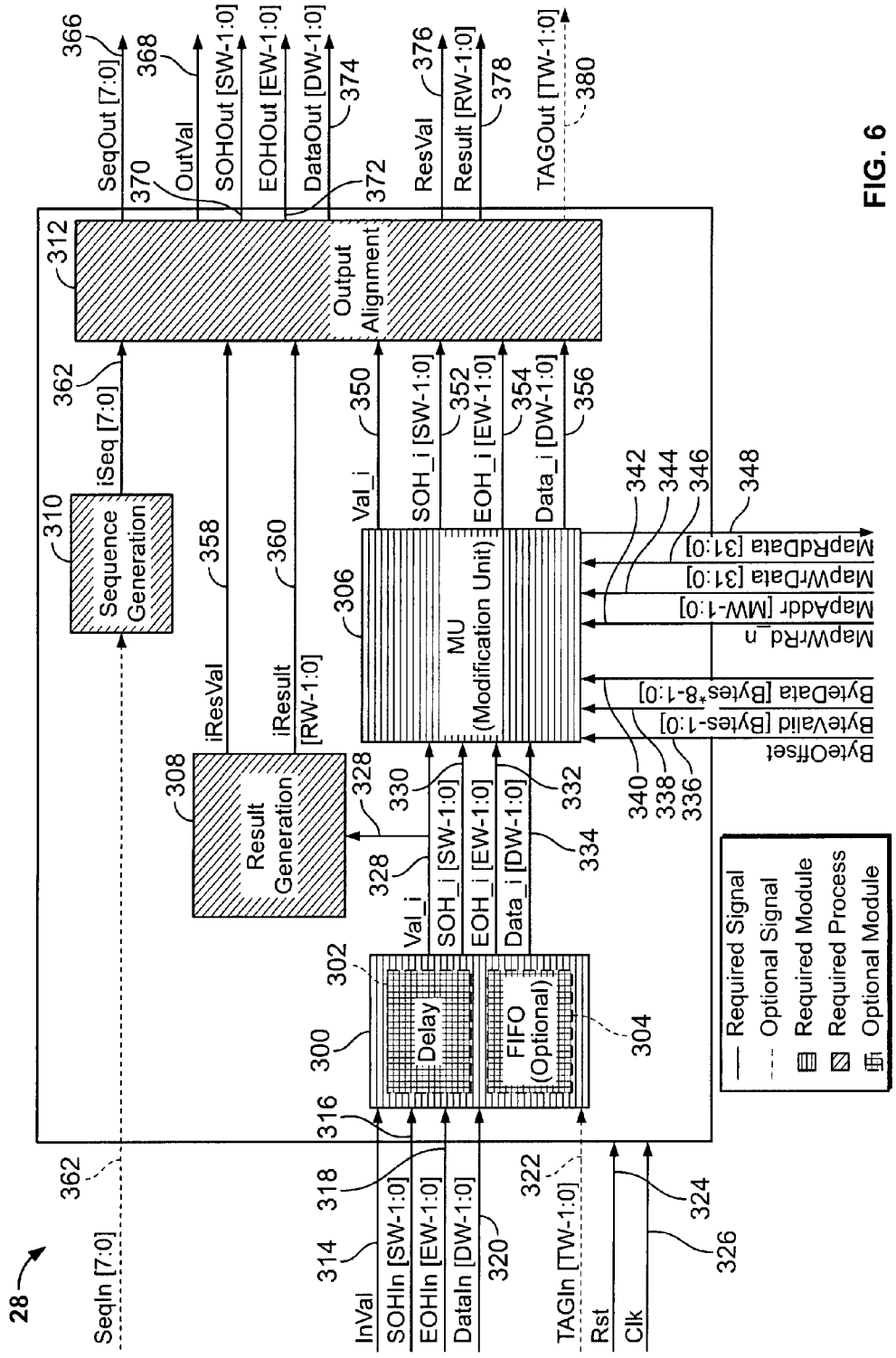
FIG. 6 is a block diagram showing, in greater detail, a Packet Modification Unit (PMU) of the present invention.

With reference to FIG. 6, a block diagram of a Packet Modification Units (PMU) 28 is depicted. A PMU allows for modification, i.e., insertion, deletion, or replacement, of bytes in a packet, including both the header and payload data. The PMU 28 includes a Delay/FIFO module 300 containing an optional Delay Line 302 or a FIFO 304, a Modification Unit (MU) 306, a Result Generation process 308, a Sequence Generation process 310, and an Output Alignment process 312, interconnected as shown. These sub-blocks 300-312 are implemented as software modules or processes.

The inputs InVal 314, SOHIn 316, EOHIn 318, DataIn 320, TagIn 322, Rst 324, and Clk 326 have the same functionality as is found in the PPU 22 and the PPUX 24. The delay/FIFO module 300 can be used to synchronize the inputs InVal 314, SOHIn 316, EOHIn 318, DataIn 320, and TagIn 322 with the outputs of the Result Generation Process 308 and the outputs of the Modification Unit (MU) 306 as is done in the PPU 22, but it also provides a second function: to delay incoming packet data by an amount equal to the number of bytes that may be inserted into a packet in the Modification Unit 306. This delay is not needed for removing or overwriting data in a packet. As with the PPU 22, the choice of the optional Delay Line 302 or the FIFO 304 depends on the size of the delay needed. If only a few clock cycles worth of delay (a few words to be inserted) are needed, then the Delay Line 302 is used, otherwise the FIFO 304 is used. As with the PPU 22, InVal 314, SOHIn 316, EOHIn 318, and DataIn 320 are pipelined to the a Modification Unit (MU) 306 as the intermediate outputs Val_i 328, SOH_i 330, EOH_i 332, and Data_i 334.

Val_i 328 is also directed to the Result Generation Process 308. The Result Generation Process 308 has a different purpose from the one found in a PPU 22. The intermediate outputs iResVal (result valid) 358 and iResult (the result) 360 are not based on a field value, but reflect the number of bytes inserted. Like a PPU 22, iResult 360 becomes the output Result 378 which can be used as an input to another PPU/PPUX/PMU/DFU. It can also be a complex expression that the user may want to program. The Sequence Generation Process 310 with the optional SeqIn input 362 has the same functionality as in the PPU 22.

The Modification Unit (MU) 306 inserts/modifies/removes data as specified by a user. The MU 306 is specified at pre-processing time as one of an inserting type, modifying type, or removing type PMU. The type of operations performed by the input signals ByteOffset 336, ByteValid 338, and ByteData 340 are shown in Table 4 below:

TABLE 4

| Signal | Ref. # in FIG. 6 | Type (In = Input; Out = Output) | Description |
|---|---|---|---|
| ByteOffset | 336 | In | Byte Offset for insertion/deletion/modification starting at zero bytes from the beginning of the packet |
| ByteValid | 338 | In | Valid (Active High) for the number of clock cycles needed to insert N bytes |
| ByteData | 340 | In | The N bytes of data to be inserted or overwritten (not used for deletion) |

The inputs MapWrRd_n 342, MapAddr 344, and MapWrData 346, and the output MapRdData 348 provide a future programming interface for an external microprocessor to allow for the reading and writing from/to internal registers of the PMU 28 to, for example, dynamically program an MU to either insert, delete, or modify a packet at run time. Val_i 350, SOH_i 352, and EOH_i 354 are passed after a delay intact from their corresponding inputs to the MU 306 to the Output Alignment process 312. The modified packet, represented as the intermediate input/output Data_i 356 is also presented to the Output Alignment process 312. The Output Alignment process 312 has the same purpose and functionality as found in the PPU or PPUX, i.e., aligning all intermediate outputs iSeq 362, iResVal 358, iResult 360, Vali_i 350, SOH_i 352, EOH_i 354 and Data_i 356 on either the start of packet (SOP) or the end of packet (EOP) to become the aligned outputs SeqOut 366, OutVal 368, SOHOut 370, EOHOut 372, DataOut 374, ResVal 376, Result 378, and TagOut 380.

Figure 7:
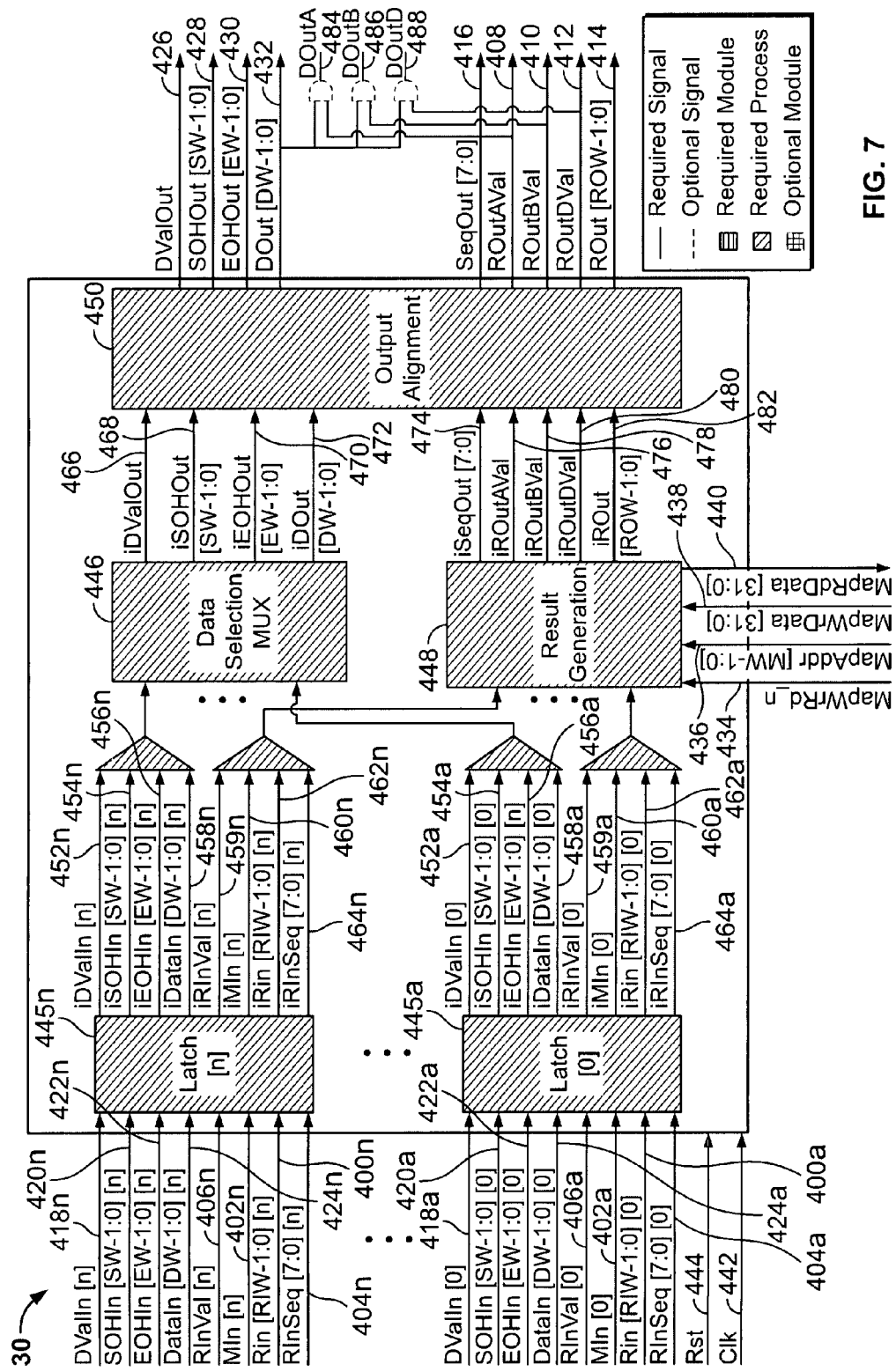
FIG. 7 is a block diagram showing, in greater detail, the Decision and Forwarding Unit (DFU) of the present invention.

With reference to FIG. 7, a block diagram of a Decision and Forwarding Unit (DFU) 30 is depicted. The DFU 30 performs drop, queue, or forward operations based on input from 1 to N PPUs, PPUXs, PMUs, or other DFUs. The DFU 30 includes a plurality of inputs and outputs 400-444. The function of each input and output 400-444, as well as the values each input or output can take on, are described with reference to Table 5 hereinbelow.

TABLE 5

| Signal | Ref. # in FIG. 7 | Type (In = Input; Out = Output) | Description |
|---|---|---|---|
| RIn | 400a-400n | In | Result from PPUs 0 to N − 1 |
| MIn | 402a-402n | In | Match from PPUs 0 to N − 1 |
| RInSeq | 404a-404n | In | Sequence Number from PPUs 0 to N − 1. The DFU matches the sequence number among all its input ports to ensure that it is operating on results for the same packet |
| RInVal | 406a-406n | In | Result valid from PPUs 0 to N − 1 (Active High) |
| ROutAVal | 408 | Out | Result output port A valid (Active High) |
| ROutBVal | 410 | Out | Result output port B valid (Active High) |
| ROutDVal | 412 | Out | Result output port D valid (Active High) |
| ROut | 414 | Out | Result output. The result is based on the evaluation of a logical expression of the match and result inputs |
| SeqOut | 416 | Out | Sequence number output. This sequence number is output with the results corresponding to the input sequence number |
| DValIn | 418a-418n | In | Data valid from PPUs 0 to N − 1 |
| SOHIn | 420a-420n | In | SOH from PPUs 0 to N − 1 |
| EOHIn | 422a-422n | In | EOH from PPUs 0 to N − 1 |
| DataIn | 424a-424n | In | Data from PPUs 0 to N − 1 |
| DValOut | 426 | Out | Data valid output |
| SOHOut | 428 | Out | SOH output |
| EOHOut | 430 | Out | EOH output |
| DOut | 432 | Out | data output |
| MapWrRd_n | 434 | In | Map read/write enable is used to program internal registers. Active high is writing, active low for reading. |
| MapAddr | 436 | In | 16 Address locations are provisioned for following usage 0X0 = DFU ID 0x1-0xF: For future use |
| MapWrData | 438 | In | Write data for the DFU map |
| MapRdData | 440 | Out | Read back data from the DFU map |
| Clk | 442 | In | Clock input |
| Rst | 444 | In | Asynchronous reset (Active high) |

Referring again to FIG. 7, the DFU 30 includes sub-blocks Latch 445a-445n, Data Selection MUX 446, Result Generation process 448, and Output Alignment process 450. The triangles within FIG. 7 are for blocking together intermediate outputs and do not themselves have inherent functionality. All sub-blocks are processes. Latch 445a-445n latches the incoming results, data, and other output signals coming from 0 to N-1 PPUs/PPUXs/PMUs to be processed at a later time inside the DFU 30. The Latch 445a-445n are necessary since each PPU/PPUX/PMU may present packet data at different times. Four signals from each Latch 445a-545n, namely iDValIn 452a-552n, iSOH 454a-554n, iEOH 456a-456n, and iData 458a-458n, corresponding to the latched inputs DValIn 418a-418n, SOH 420a-420n, EOH 422a-422n, and Data 424a-424n, respectively, and representing together data signals from each PPU/PPUX/PMU, belong to groups, which are fed together to the Data Selection MUX 446. Likewise, four signals from each Latch 445a-445n, namely iRInVal 459a-459n, iMIn 460a-460n, iRIn 462a-462n, and iRInSeq 464a-464n corresponding to the latched inputs RInVal 406a-406n, MIn 402a-402n, RIn 400a-400n, and RInSeq 404a-404n, respectively, and representing together control/result signals from each PPU/PPUX/PMU, belong to groups, which are fed together to the Result Generation process MUX 448. The Data Selection MUX 446 selects one of the sets of N-1 data groups and forwards the data group to the output group which includes iDValOut 466, iSOHOut 468, iEOHOut 470, and iDOut 472 as inputs to the Output Alignment Process 450. The Result Generation Process 448 has a similar purpose to that found in the PPU/PPUX, namely, generating a result iRout 482 which depends on the evaluation of a programmable logical expression which may depend on the value of the inputs RIn[0−(N-1)] 400a-400n and/or Min [0−(N-1)] 402a-402n. In addition, the evaluation of this complex logical expression can determine an output port to which the packet is to be routed, i.e., the pass along/queue outputs A and B, or the drop port D, represented as active high enabling intermediate outputs iROutAVal 476, iROutBVal 478, and iROutDVal 480. These outputs are passed along to the Output Alignment Process 450, which has the same purpose and function as the PPU 22, PPUX 24, and PMU 28. The intermediate outputs 466-482 become the DFU outputs DValOut 426, SOHOut 428, EOHOut 430, DOut 432, SeqOut 416, ROutAVal 408, ROutBVal 410, and ROutDVal 412, and Rout 414, respectively.

With the addition of a group of external AND gates and control outputs ROutAVal 408, ROutBVal 410, and ROutDVal 412, the output DOut 432 is routed to one of three output ports: DOutA 484, DOutB 486, or DOutD 488. Typically, DOutA 484 and DOutB 486 can be used for normal output and DOutD 478 can be used for dropping a packet (not shown). Alternatively, DOutD 488 can be used as a third routing output port. For the normal ports DOutA 484 and DOutB 486, the packet is either forwarded to a destination, or another chain of PPUs/PPUXs/PMUs, or sent to a queue of a traffic manager.

As an example of the operation of the Data Selection MUX 446 and Result Generation process 448, if the DFU 30 has two PPU inputs DIn[0] and DIn[1], and two match inputs Min[0] and Min[1], then the following conditions exist:

Output packet to Port DOutA if MIn[0] is True and Min[1] is True;

Output packet to Port DOutB if MIn[0] is True and Min[1] is False; and

Output packet to Port DOutD if MIn[0] is False and Min[1] is False.

The design environment of the present invention can be connected to a set of internal PPU/PPUX/PMU/DFU registers and programmed through a microprocessor interface. The operations that the microprocessor would perform are reads and writes to/from the registers. Table 6 below shows a sample interface for a microprocessor manufactured by Freescale, Inc. (formerly Motorola):

TABLE 6

| Signal | Type | Description |
| --- | --- | --- |
| UP_CLK | In | Clock: This is the clock for the µP interface. |
| UP_CS | In | Chip Select: This active low signal enables the core to respond to microprocessor cycles. |
| UP_RWn | In | Read/Write: Read (high)/Write (low) signal |
| UP_READY | Out | Ready: Active low signal asserted by the core to indicate the successful transfer of read or write data. |
| UP_A[15:0] | In | Address Bus: 16-bit address driven by the microprocessor to address the core registers. |
| UP_D[15:0] | In/Out | Data Bus: Bi-directional 16-bit data |
| UP_IRQ | Out | Interrupt Request: Active low signal asserted by the core to indicate that an event was detected. |

The possible types of interconnections between DFUs and PPUs are numerous. Depending on the application, the control inputs of the PPUs or DFUs can be driven with fixed values (hardwired), from programmable registers, or from the outputs of other PPUs or DFUs. Table 7 shows the options for control signal connections, with some typical examples of standard packet processing:

Each PPU/PPUX/PMU/DFU is configurable at synthesis time using the parameters shown in Table 8:

TABLE 8

| Parameter | Range | Description |
| --- | --- | --- |
| Data Width | 8, 16, 32, 64 Bits | Data bus width |
| Qualifier Input Width | 0-64 Bits | Qualifier input width See PPU interface description |
| Result Output Width | 0-64 Bits | Result output width |
| Max Header Size | 1-1023 Bytes | Maximum packet header size to be processed |
| Max Internal Lookup Depth | 1-16K | Maximum length of internal lookup table (Note that very deep and wide can consume a very large amount of memory and may not be practical or feasible) |
| Max Field Width | 1-256 | Maximum width field to be operated on |
| Max Internal Lookup Latency | 1-64 | Sets the maximum lookup latency. The configuration tool uses this parameter to determine the amount of parallelism in the lookup. If a very short latency is required, the search is done more in parallel and consumes more registers/flip-flops as opposed to memory. |
| PPUX Address Width | 1-32 | PPUX external memory address width |
| PPUX Data Width | 1-64 | PPUX external memory data width |
| Number of DFU Input Ports | 1-16 | Each DFU can be fed by up to 16 PPUs/PPUXs |

Figure 8:
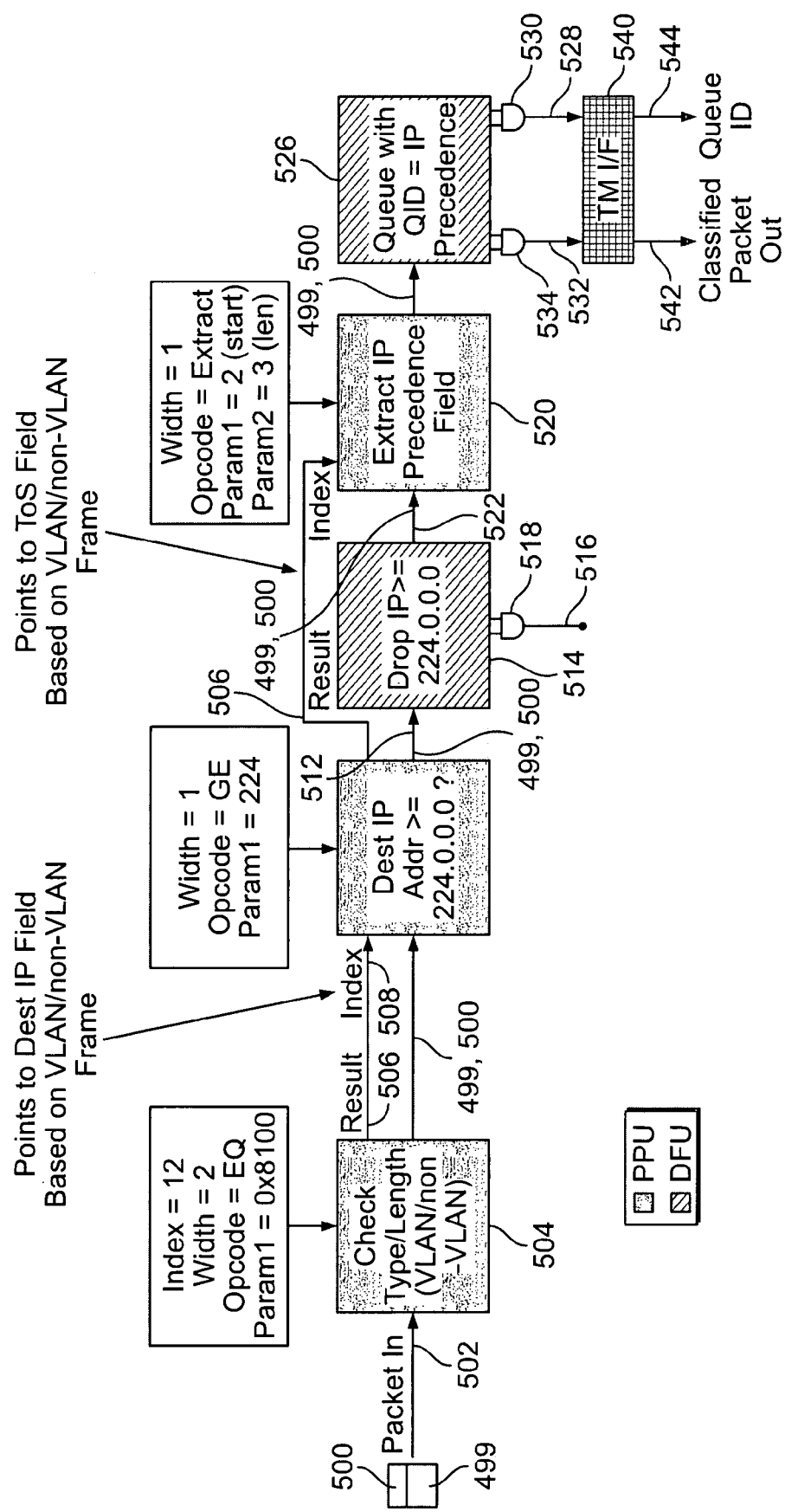
FIG. 8 is a block diagram showing a sample packet processor design for determining the queuing precedence of a VLAN/non-VLAN frame.

With reference to FIG. 8, a block diagram is depicted showing a sample packet processing algorithm design using the present invention. In this example, the packet processing algorithm relates to extracting the precedence field of an IP packet for a VLAN/Non-VLAN frame from a packet header 500 belonging to a packet 499. Pseudo code which imple-

TABLE 7

| PPU Control Input | Connected To | Description/Functionality |
| --- | --- | --- |
| Qualifier | Fixed Value | PPU always enabled |
| | Register | Enable/disable under software control |
| | Other PPU/DFU | Enable/disable conditionally depending on result from other PPU/DFU |
| Index | Fixed Value | Index is fixed. Example: MAC Destination or Source Address |
| | Register | Index is software programmable |
| | Other | Index depends on result from other PPU/DFU. |
| | PPU/DFU | Example: IP Destination Address for untagged or VLAN frames |
| Width | Fixed Value | Width is fixed. Example: MAC Destination or Source Address |
| | Register | Width is software programmable |
| | Other | Width depends on result from other PPU/DFU. |
| | PPU/DFU | Example: IPv4 or IPv6 Address |
| Mask | Fixed Value | Mask value fixed or not used |
| | Register | Mask value is software programmable |
| | Other PPU/DFU | Mask value depends on result from other PPU/DFU |
| Opcode | Fixed Value | Opcode is fixed. Example: Equal |
| | Register | Opcode is software programmable |
| | Other PPU/DFU | Opcode changes depending on result from other PPU/DFU |
| Param<1,2> | Fixed Value | Parameter(s) value is fixed. Example: Check for fixed MAC Address |
| | Register | Parameter(s) value is software programmable. Example: Check for programmable MAC Address. |
| | Other PPU/DFU | Parameter(s) value depends on result from other PPU/DFU. Example: Check TTL field in IP packet | ments the two DFUs and the three PMUs of FIG. 8 can be found in Appendix H-L. A top-level file for the example of FIG. 8, expressed in pseudo code, can be found in Appendix M. The precedence field is used as the QID of the queue into which the packet is to be stored in a traffic manager. The packet header 500 is fed to a DataIn input 502 of a PPU 504. The PPU 504 determines first whether the inputted packet header 500 belongs to a virtual LAN (VLAN) frame or a non-VLAN frame by pointing to byte 12 of the header (Index=12) with a field width of 2 bytes. The operation to be performed is:

EQ(Data_Field(byte 12, width 2) AND
    Mask=0xFFFF, Param1=0x8100, Param2=0)

If packet header 500 points to a VLAN frame, then the Result output 506 of the PPU 504 is set to point to the location or offset in the packet header 500 of the IP address in a VLAN type frame, otherwise it points to the location in the packet header 500 of the IP address in a non-VLAN frame. This IP address is fed to the Index input 508, along with the header 500 to a second PPU 510. In the PPU 510, the most significant byte is checked and must be less than 224, signifying that the input IP address is valid. The operation to be performed is:

GE(Data_Field(byte=MSB of IP address, width=1)
    AND Mask=0xFF, Param1=224, Param2=0)

The packet header 500 is then passed to the Din[0] input 512 of a DFU 514. If the DA field of the IP address is >=224.0.0.0, then the packet is to be dropped by placing the header on the DOutD output 516 of an AND gate 518 connected to the DFU 514. Otherwise, the packet 499 is forwarded to a third PPU 520 with the Index input 522 of the PPU 520 pointing to the "type of service" field (ToS) in the header 500 based on whether the packet 499 belongs to a VLAN or non-VLAN frame. The ToS tells the application how a datagram should be used, e.g. delay, precedence, reliability, minimum cost, throughput etc. Depending on the value of the ToS field, one can change a priority assigned to a packet which is then sent to a traffic manager which processes the packet based on the set priority.

In the PPU 520, the IP precedence field is extracted from the header 500 with the following operation:

EXTR(Data_Field(byte=ToS field location, width=1)
    AND Mask=0xFF, Param1=2 (start), Param2=3
    (len))

The IP precedence field is fed to the Din[0] input 524 of a second DFU 526. The DFU 526 places the packet header on the DOutA output 528 of an AND gate 530 for queueing, and the precedence field is placed on the DOutB output 532 of an AND gate 534. The precedence field functions as the Queue Identifier (QID) for the packet to be queued and both inputs 536, 538 are fed to a traffic manager 540. The traffic manager 540 outputs the classified packet on output 542 and the QID on output 544.

The present invention is subject to numerous variations and modifications. For example, the packet processing blocks having other types of functionality can be provided, such as:
  checksum or CRC generation and/or checking
  packet content modification/editing
  packet header removal
  packet header or trailer addition (e.g., for downstream processing)
  per flow rate control As an alternative to a textual programming interface for implementing a given packet parser/classifier, the programmer/designer can use a graphical design program such as OrCAD or Microsoft Visio to draw and interconnect sub-blocks with input windows for entering interconnecting expressions and entering program inputs.

The present invention has several advantages over prior art packet processing products. The present invention can be used to produce an inexpensive piece of digital hardware, while the prior art products are limited to programs running on a microprocessor. The present invention is scalable to handle simple to complex classification tasks, and software modules can be connected and configured in a variety of ways.

It will be understood that the embodiment described herein is merely exemplary and that a person skilled in the art may make many variations and modifications without departing from the spirit and scope of the invention. All such variations and modifications are intended to be included within the scope of the present invention as defined in the appended claims.

What is claimed is:

1. A system for designing packet processing products, comprising:
    a user interface for allowing a user to define a desired packet processing algorithm using a plurality of discrete packet processing blocks, each of said blocks corresponding to a portion of said desired packet processing algorithm;
    means for allowing the user to define connections between said plurality of packet processing blocks;
    means for processing said plurality of packet processing blocks and said connections to provide a list of instructions in a hardware description language for producing an integrated circuit capable of executing said desired packet processing algorithm; and
    a NETLIST generated using said list of instructions.

2. The system of claim 1, further comprising an integrated circuit constructed using said list of instructions.

3. A system for designing packet processing products, comprising:
    a user interface for allowing a user to define a desired packet processing algorithm using a plurality of discrete packet processing blocks, each of said blocks corresponding to a portion of said desired packet processing algorithm;
    means for allowing the user to define connections between said plurality of packet processing blocks; and
    means for processing said plurality of packet processing blocks and said connections to provide a list of instructions in a hardware description language for producing an integrated circuit capable of executing said desired packet processing algorithm,
    wherein said plurality of packet processing blocks further includes a Packet Processing Unit (PPU) for:
        extracting a header of a packet;
        pointing to a portion of the header of a predetermined width using a predetermined index of a bit location in the header;
        comparing the data represented by the portion of the header with at least one predetermined value; and
        declaring a match when the result of the comparison is true.

4. The system of claim 3, wherein said Packet Processing Unit further includes means for accessing an external Content-Addressable Memory (CAM) or Random-Access Memory (RAM).

5. The system of claim 4, wherein said Packet Processing Unit further includes a Hardware Lookup Unit for extracting a desired portion of header of a packet based on determining when a start of header bit is active;
determining the number of bits for which the data stream of the packet is valid after said start of header bit is active; and
determining when the end of header bit is active; and
extracting said header based on said start of header bit, said number of bits, said end of header bit, said index, and said width.

6. The system of claim 5, wherein said Packet Processing Unit further includes a Delay/FIFO module for delaying the extracted header by the sum of a predetermined number of clock cycles and a variable number of clock cycles based on said predetermined index.

7. The system of claim 6, wherein said Delay/FIFO module is implemented using a delay line.

8. The system of claim 6, wherein said Delay/FIFO module is implemented using a FIFO.

9. The system of claim 6, wherein said Packet Processing Unit further includes a Match and Lookup Unit for determining if a user defined match of a condition is true to generate a match output based on a comparison of said desired portion of header of a packet with one or more user defined parameters and a predetermined logical condition.

10. The system of claim 9, wherein said Packet Processing Unit further includes a Result Generation process for generating a result output based on one of a fixed expression, an arithmetic expression, and a logical expression.

11. The system of claim 10, wherein said result output is used as an input to another Packet Parsing Unit.

12. The system of claim 10, wherein said Packet Processing Unit further includes a Sequence Generation process for generating a sequence number for use by a Decision and Forwarding Unit.

13. The system of claim 12, wherein said Packet Parsing Unit further includes an Output Alignment process for aligning said packet header with said result output and said match output.

14. The system of claim 13, wherein said packet header, said result output, and said match output are aligned on a start of packet boundary.

15. The system of claim 13, wherein said packet header, said result output, and said match output are aligned on an end of packet boundary.

16. The system of claim 13, wherein said Packet Parsing Unit has a plurality of internal programmable registers.

17. The system of claim 13, wherein said Packet Parsing Unit is programmable from an external microprocessor.

18. A system for designing packet processing products, comprising:
a user interface for allowing a user to define a desired packet processing algorithm using a plurality of discrete packet processing blocks, each of said blocks corresponding to a portion of said desired packet processing algorithm;
means for allowing the user to define connections between said plurality of packet processing blocks; and
means for processing said plurality of packet processing blocks and said connections to provide a list of instructions in a hardware description language for producing an integrated circuit capable of executing said desired packet processing algorithm,
wherein said plurality of packet processing blocks further includes a Packet Modification Unit (PMU) for:
extracting a packet;
pointing to a portion of the packet of a predetermined width using a predetermined index of a bit location in the packet; and
modifying the portion of the packet.

19. The system of claim 18, wherein modifying the portion of the packet further includes means for deleting the portion of the packet.

20. The system of claim 18, wherein modifying the portion of the packet further includes means for overwriting the portion of the packet.

21. The system of claim 18, wherein modifying the portion of the packet further includes means for inserting data at the position in the portion of the packet pointed to by index.

22. The system of claim 18, wherein said Packet Modification Unit further includes a Delay/FIFO module for delaying the packet by the sum of a predetermined number of clock cycles and a variable number of clock cycles based on a number of bytes to be inserted.

23. The system of claim 22, wherein said Delay/FIFO module is implemented using a delay line.

24. The system of claim 22, wherein said Delay/FIFO module is implemented using a FIFO.

25. The system of claim 22, wherein said Packet Modification Unit further includes a Modification Unit for modifying said portion of the packet based on a ByteOffset input indicating said index and ByteValid input indicating the number of clock cycles needed for modifying the packet.

26. The system of claim 25, wherein said Modification Unit further includes a ByteData input for providing bytes to be inserted into the packet.

27. The system of claim 25, wherein said Packet Modification Unit further includes a Result Generation process for generating a result output based on a number of bytes inserted into the packet.

28. The system of claim 27, wherein said result output is used as an input to one of another Packet Parsing Unit and another Packet Modification Unit.

29. The system of claim 27, wherein said Packet Modification Unit further includes a Sequence Generation process for generating a sequence number for use by a Decision and Forwarding Unit.

30. The system of claim 29, wherein said Packet Modification Unit further includes an Output Alignment process for aligning said packet with said result output.

31. The system of claim 30, wherein said packet and said result output are aligned on a start of packet boundary.

32. The system of claim 30, wherein said packet header and said result output are aligned on an end of packet boundary.

33. The system of claim 18, wherein said Packet Modification Unit is programmable from an external microprocessor.

34. A system for designing packet processing products, comprising:
a user interface for allowing a user to define a desired packet processing algorithm using a plurality of discrete packet processing blocks, each of said blocks corresponding to a portion of said desired packet processing algorithm;
means for allowing the user to define connections between said plurality of packet processing blocks; and
means for processing said plurality of packet processing blocks and said connections to provide a list of instructions in a hardware description language for producing an integrated circuit capable of executing said desired packet processing algorithm,
wherein said plurality of packet processing blocks further includes a Decision and Forwarding Unit (DFU) for performing one of drop, queue, and forwarding operations on at least one packet.

35. The system of claim 34, wherein said Decision and Forwarding Unit performs one of drop, queue, and forwarding operations on at least one packet based on at least one match output and at least one result output of a Packet Processing Unit.

36. The system of claim 35, wherein said Decision and Forwarding Unit further includes a first Latch for latching said at least one incoming packet and a second Latch for latching a result output associated with said at least one incoming packet.

37. The system of claim 36, wherein said Decision and Forwarding Unit further includes a Data Selection Multiplexer for selecting one of said at least one incoming packet for output to one of a drop, queue, and forwarding port.

38. The system of claim 37, wherein said Decision and Forwarding Unit further includes a Result Generation process for selecting a result output and a match output associated with said at least one incoming packet.

39. The system of claim 38, wherein said match output and said result output determines to which port said packet is forwarded.

40. The system of claim 38, wherein said result output is based on one of a fixed expression, an arithmetic expression, and a logical expression.

41. The system of claim 38, wherein said Decision and Forwarding Unit further includes an Output Alignment process for aligning said packet with said result output.

42. The system of claim 41, wherein said packet and said result output are aligned on a start of packet boundary.

43. The system of claim 41, wherein said packet header and said result output are aligned on an end of packet boundary.

44. The system of claim 34, wherein said Decision and Forwarding Unit is programmable from an external microprocessor.

45. A method for designing packet parsing and classification products, comprising the steps of:
   providing a user interface at a computer system for allowing a user to define a desired packet processing algorithm using a plurality of discrete packet processing blocks, each of said blocks corresponding to a portion of said desired packet processing algorithm;
   allowing the user to define connections between said plurality of packet processing blocks using said user interface of said computer system;
   processing said plurality of packet processing blocks and said connections to provide a list of instructions in a hardware description language for producing an integrated circuit capable of executing said desired packet processing algorithm; and
   generating a NETLIST using said list of instructions.

46. The method of claim 45, further comprising the step of constructing an integrated circuit using said list of instructions.

47. A method for designing packet parsing and classification products, comprising the steps of:
   providing a user interface at a computer system for allowing a user to define a desired packet processing algorithm using a plurality of discrete packet processing blocks, each of said blocks corresponding to a portion of said desired packet processing algorithm;
   allowing the user to define connections between said plurality of packet processing blocks using said user interface of said computer system;
   processing said plurality of packet processing blocks and said connections to provide a list of instructions in a hardware description language for producing an integrated circuit capable of executing said desired packet processing algorithm; and
   filling out a connection document based on the plurality of packet processing blocks.

48. The method of claim 47, wherein said connection document is implemented in a graphical user interface.

49. The method of claim 48, further including the step of configuring the plurality of packet processing blocks from a plurality of files each containing a different type of packet processing block of maximal functionality.

50. The method of claim 49, wherein said step of configuring further includes the step of using a preprocessor to perform substitution, looping, and branching to cull a customized packet processing block from said packet processing block of maximal functionality.

51. The method of claim 50, further including the step of instantiating the plurality of processing blocks and making connections between said packet processing blocks in a top level file.

52. A method for designing packet parsing and classification products, comprising the steps of:
   providing a user interface at a computer system for allowing a user to define a desired packet processing algorithm using a plurality of discrete packet processing blocks, each of said blocks corresponding to a portion of said desired packet processing algorithm;
   allowing the user to define connections between said plurality of packet processing blocks using said user interface of said computer system; and
   processing said plurality of packet processing blocks and said connections to provide a list of instructions in a hardware description language for producing an integrated circuit capable of executing said desired packet processing algorithm, wherein the plurality of packet processing blocks includes
   a Packet Processing Unit (PPU) for:
      extracting a header of a packet;
      pointing to a portion of the header of a predetermined width using a predetermined index of a bit location in the header;
      comparing the data represented by the portion of the header with at least one predetermined value; and
      declaring a match when the result of the comparison is true.

53. The method of claim 52, wherein said Packet Processing Unit further includes means for accessing an external CAM or RAM.

54. The system of claim 53, wherein said plurality of packet processing blocks further includes a Packet Modification Unit (PMU) for:
   extracting a packet;
   pointing to a portion of the packet of a predetermined width using a predetermined index of a bit location in the packet; and
   modifying the portion of the packet.

55. The system of claim 54, wherein said plurality of packet processing blocks further includes a Decision and Forwarding Unit (DFU) for performing one of drop, queue, and forwarding operations on at least one packet.

56. A system for designing packet processing products, comprising:
   a user interface for allowing a user to define a desired packet processing algorithm using a plurality of discrete packet processing blocks, each of said blocks corresponding to a portion of said desired packet processing algorithm;

means for allowing the user to define connections between said plurality of packet processing blocks;

means for processing said plurality of packet processing blocks and said connections to provide a list of instructions in a hardware description language for producing an integrated circuit capable of executing said desired packet processing algorithm; and a packet processing block for checksum or CRC generation or checking.

57. A system for designing packet processing products, comprising:

a user interface for allowing a user to define a desired packet processing algorithm using a plurality of discrete packet processing blocks, each of said blocks corresponding to a portion of said desired packet processing algorithm;

means for allowing the user to define connections between said plurality of packet processing blocks;

means for processing said plurality of packet processing blocks and said connections to provide a list of instructions in a hardware description language for producing an integrated circuit capable of executing said desired packet processing algorithm; and a packet processing block for packet header removal.

58. A system for designing packet processing products, comprising:

a user interface for allowing a user to define a desired packet processing algorithm using a plurality of discrete packet processing blocks, each of said blocks corresponding to a portion of said desired packet processing algorithm;

means for allowing the user to define connections between said plurality of packet processing blocks;

means for processing said plurality of packet processing blocks and said connections to provide a list of instructions in a hardware description language for producing an integrated circuit capable of executing said desired packet processing algorithm; and a packet processing block for packet header or trailer addition.

59. A system for designing packet processing products, comprising:

a user interface for allowing a user to define a desired packet processing algorithm using a plurality of discrete packet processing blocks, each of said blocks corresponding to a portion of said desired packet processing algorithm;

means for allowing the user to define connections between said plurality of packet processing blocks;

means for processing said plurality of packet processing blocks and said connections to provide a list of instructions in a hardware description language for producing an integrated circuit capable of executing said desired packet processing algorithm; and a packet processing block for per flow rate control.

* * * * *

UNITED STATES PATENT AND TRADEMARK OFFICE
CERTIFICATE OF CORRECTION

| | | |
|---|---|---|
| PATENT NO. | : 7,724,684 B2 | |
| APPLICATION NO. | : 11/805702 | |
| DATED | : May 25, 2010 | |
| INVENTOR(S) | : Cassod et al. | |

It is certified that error appears in the above-identified patent and that said Letters Patent is hereby corrected as shown below:

Please add Appendix A – Appendix L to the patent as attached.

Signed and Sealed this
Thirty-first Day of May, 2011

David J. Kappos
*Director of the United States Patent and Trademark Office*

APPENDIX A

```
// ---------------------------------------------------------------
// This file contains generic Packet Processing Unit (PPU)
// ---------------------------------------------------------------

Object PPU
PARAMETERS (
// configuration constant
DataWidth        = @EQ(DataWidth);
Log2DataWidth    = @L2(DataWidth);
MaxHdrWords      = @EQ(MaxHdrWords);
Log2MaxHdrWords  = @L2(MaxHdrWords);
QualifierWidth   = @EQ(QualifierWidth);
ResultWidth      = @EQ(ResultWidth);
FieldWidth       = @EQ(FieldWidth);
Log2FieldWidth   = @L2(FieldWidth);
LookupAvaliable  = @EQ(LookupAvaliable);
LookupDepth      = @EQ(LookupDepth);
Log2LookupDepth  = @L2(LookupDepth);
TAGBits          = @EQ(TAGBits);
SobBits          = @EQ(SobBits);
EobBits          = @EQ(EobBits);
UseFIFOStorage   = @EQ(UseFIFOStorage);
PPUID            = @EQ(PPUID);
IndexWidth       = Log2DataWidth+Log2MaxHdrWords;

)
INTERFACES(
// Result output expression is  @Result_Expression
// clock & reset
input                           Rst;

input                           Clk;
// input packet header
input                           InVal;
input   [SobBits-1:0]           SOHIn;
input   [EobBits-1:0]           EOHIn;
input   [DataWidth-1:0]         DataIn;
// output packet header
output                          OutVal;
output  [SobBits-1:0]           SOHOut;
output  [EobBits-1:0]           EOHOut;
output  [DataWidth-1:0]         DataOut;
// control signal
input   [QualifierWidth-1:0]    QualEnb;
input   [2:0]                   QualCond;

input   [IndexWidth-1:0]        Index;
input   [Log2FieldWidth:0]      Width;
input   [2:0]                   Opcode;
input   [FieldWidth-1:0]        Param1;
input   [FieldWidth-1:0]        Param2;
input   [FieldWidth-1:0]        Mask;
//if_generate (TAGBits!=0)
input   [TAGBits-1:0]           TAG;
//end_generate
// Micro-processor bus
```

```
input                            MapWrRd_n;
input    [3:0]                   MapAddr;
input    [31:0]                  MapWrData;
output   [31:0]                  MapRdData;
// Result values
output                           Match;
output                           ResVal;
output   [ResultWidth-1:0]       Result;
//if_generate (GenSeq==0)
input    [7:0]                   SeqIn;
//end_generate
output   [7:0]                   SeqOut;
);
{
//*********************************************************************
// internal signal decleration
//*********************************************************************
signal                           ExtOutVal;
signal   [SobBits-1:0]           ExtOutSob;
signal   [EobBits-1:0]           ExtOutEob;
signal   [DataWidth-1:0]         ExtOutDat;

signal   [FieldWidth-1:0]        ExtHdrValue;

signal   [IndexWidth-1:0]        AdjustedIndex = Index + Width;

signal                           ExtHdrValid;
signal                           ExtHdrValid   [NoOfLookups-1:0];
signal   [DataWidth-1:0]         ExtHdrValue   [NoOfLookups-1:0];
signal   [Log2MaxHdrWords:0]     WordNo        [NoOfLookups-1:0];
signal   [Log2DataWidth-1:0]     StartIndex    [NoOfLookups-1:0];
signal   [Log2DataWidth-1:0]     DataShift;
constant                         FieldWidthMultiple = (FieldWidth+DataWidth-1)/DataWidth;

FOR i from 1 to (NoOfLookups-1) increment 1
WordNo[i]    = (Index[IndexWidth-1:Log2DataWidth]+i);
StartIndex[i] = 0;
ENDLOOP signal                           iOutVal;
signal                           iOutMatch;
signal                           QEnable;
signal   [QualifierWidth-1:0]    QualEnbCondition;

signal                           LkWrEnb;
signal   [Log2LookupDepth-1:0]   LkWrAddr;
signal   [FieldWidth-1:0]        LkWrData;
signal   [FieldWidth-1:0]        LkWrRBData;

// Special purpose registers for the MLU Blocks for custom instruction
signal   [31:0]                  SPReg_0;
signal   [31:0]                  SPReg_1;
signal   [31:0]                  SPReg_2;
signal   [31:0]                  SPReg_3;

signal                           Match;
constant                         Idle = 0;
```

```
constant                            Xfr  = 1;

// TEMPLATE CLASS instantiation for HLU
HLU
(
   @EQ(NoOfLookups),
   SobBits, EobBits, DataWidth,
   Log2DataWidth,
   MaxHdrWords, Log2MaxHdrWords,
   DataWidth
)
HeaderExtract_NameInstance
(
    // reset and clock
    Rst, Clk,
    // decoding rules
    WordNo , StartIndex,
    // input data
    InVal, SOHIn, EOHIn, DataIn,
    // Decoded Header Values
    ExtHdrValid, ExtHdrValue,
    // output data
    ExtOutVal, ExtOutSob, ExtOutEob, ExtOutDat
);

// data byte alingment
PROCESS (on change to ExtHdrValue)

//if_generate (Custom_Shift == 0)
    Adjust    ExtHdrValue    with         DataWidth,    FieldWidth    &
AdjustedIndex[Log2DataWidth-1:0] to have\
    the correct byte alingment at byte zero
    //else_generate
    Adjust  ExtHdrValue with   custom shift to have the correct byte
alingment defined by the user
    //end_generate
ENDPROCESS // extract qualifier enable
PROCESS (on rising edge of Clk)
   IF Rst is high
      assign inittal value to QEnable
   ELSE
      set QEnable to disabled state Zero to begin
      // get the case statement for enable
      CASE (QualCond)
           3'd0 : set QEnable to enable state One to Unconditional
           3'd1 : set QEnable to enable state One to if QualEnbCondition
Equal to QualEnb
           3'd2 : set QEnable to enable state One to if QualEnbCondition
Greater than QualEnb
           3'd3 : set QEnable to enable state One to if QualEnbCondition
Greater than or Equal to QualEnb
```

```
                    3'd4 : set QEnable to enable state One to if QualEnbCondition
Less than QualEnb
                    3'd5 : set QEnable to enable state One to if QualEnbCondition not
Equal to QualEnb
                    default : QEnable  = 0;
            ENDCASE
        ENDIF
ENDPROCESS // MLU Template class instance
MLU
(       FieldWidth,    Log2FieldWidth,    LookupAvaliable,    LookupDepth,
Log2LookupDepth )
MLU_NameInstance
(
    // reset and clock
    Rst, Clk,
    // control signals
    QEnable, Opcode, Width, Param1, Param2, LkWrEnb, LkWrAddr, LkWrData,
LkWrRBData,
    SPReg_0, SPReg_1, SPReg_2, SPReg_3,
    // input check values
    ExtHdrValid, ExtHdrValue, Mask,
    // results
    iOutVal, iOutMatch
);

//
************************************************************************
**********
// I/O out signal
//if_generate (LookupAvaliable==1 || UseFIFOStorage == 1)

if LookupAvaliable is avaliable or UseFIFOStorage option is enabled
            // internal signals
            signal                          iEnbOut;
            signal                          iValOut;
            signal     [SobBits-1:0]        iSOHOut;
            signal     [EobBits-1:0]        iEOHOut;
            signal     [DataWidth-1:0]      iDataOut;
            signal                          OutState;

// assign the fifo output to be the output
            OutVal  = iValOut;
            SOHOut  = iSOHOut;
            EOHOut  = iEOHOut;
            DataOut = iDataOut;
            Result  = @Result_Expression;
            ResVal  = (iSOHOut[SobBits-1] & iValOut);

// Packet FIFO template class
            PacketFifo
            (
                Log2MaxHdrWords, (DataWidth+SobBits+EobBits-1)
            )
            PktSCFifo_NameInstance
            (
              // write I/F
              (Rst), (Clk),
```

```
                (ExtOutVal),                                    (ExtOutEob[EobBits-1]),
({ExtOutSob,ExtOutEob[EobBits-2:0],ExtOutDat}),
        // read I/F
        (Rst), (Clk),
        (iEnbOut),              (iValOut),              (iEOHOut[EobBits-1]),
({iSOHOut,iEOHOut[EobBits-2:0],iDataOut}),
        //flags
        (open), (open), (open)
    );

// transfer from the fifo out to the user
        // after the result is declared
        PROCESS (on rising edge of Clk): OUTPUT_ALINGEMENT_PROCESS
          IF Rst is high
             assign reset values to iEnbOut
             assign reset values to OutState
             assign reset values to Match
          ELSE
             // transfer the data when lookup is done
             CASE (OutState)
                Idle :
                    turn off iEnbOut to the fifo
                    // check if valid received form he lookup
                    if iOutVal from MLU is received high
                       give iEnbOut to the fifo
                       iEnbOut       = 1;
                       declare Match based on iOutMatch value
                       set OutState to goto next stage Xfr
                    ENDIF Xfr :
                    keep reading the fifo
                    if Valid eop received from the FIFO go back to IDLE
stage
             ENDCASE
          ENDIF
        ENDPROCESS ELSE   // No Lookup Avaliable
//end_generate
       // reclock signals
       signal[Log2MaxHdrWords+2:0]     SelIndex;
       signal                          ExtOutVal_r[MaxHdrWords+2:0];
       signal[SobBits-1:0]             ExtOutSob_r[MaxHdrWords+2:0];
       signal[EobBits-1:0]             ExtOutEob_r[MaxHdrWords+2:0];
       signal[DataWidth-1:0]           ExtOutDat_r[MaxHdrWords+2:0];
       signal                          iResVal;

OutVal  = ExtOutVal_r[SelIndex];
       SOHOut  = ExtOutSob_r[SelIndex];
       EOHOut  = ExtOutEob_r[SelIndex];
       DataOut = ExtOutDat_r[SelIndex];
       Result  = @Result_Expression;
       ResVal  = iResVal;
       // on reclock will do for no lookup PROCESS (on rising edge of Clk): OUTPUT_ALINGEMENT_PROCESS
          IF Rst is high
```

```
                    assign reset values to iResVal
                    assign reset values to Match
                    assign reset values to SelIndex
                ELSE
                    Reclock the signals ExtOutVal_r, ExtOutSob_r, ExtOutEob_r &
ExtOutDat_r\
                    to generate a MaxHdrWords+3 word pipline for future usage
                    // default
                    set iResVal to Zero IF valid SOHIn is recieved
                        // word lookup   + 1 match clock
                        Calculate SelIndex based on WordNo of the last lookup
                    ENDIF
                    // gen expression
                    IF  iOutVal is set to high
                        declare iResVal to be valid
                        set Match as iOutMatch
                    ENDIF
                ENDIF
            ENDPROCESS //if_generate (LookupAvaliable==1   || UseFIFOStorage == 1)
ENDIF
//end_generate //
**************************************************************************
**********
// sequence out process
PROCESS (on rising edge of Clk): SEQUENCE_GENERATION
    IF Rst is high
        assign reset values to SeqOut
    ELSE
        //if_generate (GenSeq==0)
        IF valid SOHIn is recieved
            set SeqOut equal to SeqIn
        ENDIF
        //else_generate
        // increment the sequence no if valid InSOH is detected
        IF valid SOHIn is recieved
            increment SeqOut by one
        ENDIF
        //end_generate
    ENDIF
 ENDPROCESS
//
**************************************************************************
**********
// Register map
//
**************************************************************************
**********

// register map process
PROCESS (on rising edge of Clk): REGISTER_MAP
```

```
        IF Rst is high
            assign reset values to MapRdData, QualEnbCondition, LkWrEnb, LkWrAddr,\
            LkWrData, SPReg_0, SPReg_1, SPReg_2, SPReg_3,
        ELSE // case address decoding
            IF user requested a write operation
                CASE (MapAddr)
                    // PPU_ID NO Write
                    // Enable Condition
                    1:
                        latch QualEnbCondition from MapWrData
                    // map address
                    2:
                        latch LkWrAddr from MapWrData
                    // map data
                    3:
                        issue write to user look table using LkWrEnb
                        latch LkWrData from MapWrData
                    4:
                        latch SPReg_0 from MapWrData
                    5:
                        latch SPReg_1 from MapWrData
                    6:
                        latch SPReg_2 from MapWrData
                    7:
                        latch SPReg_3 from MapWrData
                ENDCASE
            // if reading
            ELSE
                CASE (MapAddr)
                    // PPU ID read only
                    0:
                        set MapRdData to PPUID
                    // Enable Condition
                    1:
                        set MapRdData to QualEnbCondition
                    // map address
                    // address needs to be set
                    // for reading data
                    // map data
                    3:
                        set MapRdData to LkWrRBData
                    4:
                        set MapRdData to SPReg_0
                    5:
                        set MapRdData to SPReg_1
                    6:
                        set MapRdData to SPReg_2
                    7:
                        set MapRdData to SPReg_3
                ENDCASE
            ENDIF

ENDIF
 ENDPROCESS
)
```

APPENDIX B

```
// ----------------------------------------------------------------
// This file contains decision forwarding unit (DFU)
// ----------------------------------------------------------------
// ----------------------------------------------------------------
Object DFU
PARAMETERS (
// configuration constant
DataWidth            = @EQ(DataWidth);
InResultWidth        = @EQ(InResultWidth);
OutResultWidth       = @EQ(OutResultWidth);
NumPPUConnects       = @EQ(NumPPUConnects);
Log2NumPPUConnects   = @L2(NumPPUConnects);
DFUID                = @EQ(DFUID);
SopBits              = @EQ(SopBits);
EopBits              = @EQ(EopBits);
)
INTERFACES(
  // clock & reset
input                                   Rst;
input                                   Clk;
// Micro-processor bus
input                                   MapWrRd_n;
input   [2:0]                           MapAddr;
input   [31:0]                          MapWrData;
output  [31:0]                          MapRdData;
// input buses
input   [NumPPUConnects-1:0]            RInVal;
input   [NumPPUConnects-1:0]            MIn;
//for_generate @i (NumPPUConnects)
input   [InResultWidth-1:0]             RIn_@EQ(i);
input   [7:0]                           RInSeq_@EQ(i);
//end_generate
// in packet header
input   [NumPPUConnects-1:0]            DValIn;
//for_generate @i (NumPPUConnects)
input   [SopBits-1:0]                   SOHIn_@EQ(i);
input   [EopBits-1:0]                   EOHIn_@EQ(i);
input   [DataWidth-1:0]                 DIn_@EQ(i);
//end_generate
// out result
output                                  ROutAVal;
output                                  ROutBVal;
output                                  ROutDVal;
output  [OutResultWidth-1:0]            ROut;
output  [7:0]                           SOut;
// out packet header common
output                                  DValOut;
output  [SopBits-1:0]                   SOHOut;
output  [EopBits-1:0]                   EOHOut;
output  [DataWidth-1:0]                 DOut;
output                                  OutOfSeqErr;
);
{
// internal signals
signal                                  StartOutputData;
signal                                  SequenceCheck;
signal  [NumPPUConnects-1:0]            iRInVal;
```

```
signal [NumPPUConnects-1:0]              iMIn;
signal [InResultWidth-1:0]               iRIn     [NumPPUConnects-1:0];
signal [7:0]                             iRInSeq  [NumPPUConnects-1:0];

signal  [InResultWidth-1:0]              RIn      [NumPPUConnects-1:0];
signal  [7:0]                            RInSeq[NumPPUConnects-1:0];
signal  [SopBits-1:0]                    SOHIn    [NumPPUConnects-1:0];
signal  [EopBits-1:0]                    EOHIn    [NumPPUConnects-1:0];
signal  [DataWidth-1:0]                  DIn      [NumPPUConnects-1:0];
//for_generate @i (NumPPUConnects)
RIn    [@EQ(i)]  =  RIn_@EQ(i);
RInSeq[@EQ(i)]   =  RInSeq_@EQ(i);
SOHIn [@EQ(i)]   =  SOHIn_@EQ(i);
EOHIn [@EQ(i)]   =  EOHIn_@EQ(i);
DIn   [@EQ(i)]   =  DIn_@EQ(i);
//end_generate
signal [NumPPUConnects-1:0]              Match = MIn OR iMIn;
signal [InResultWidth-1:0]               Result   [NumPPUConnects-1:0];
signal [7:0]                             Sequence [NumPPUConnects-1:0];
signal [Log2NumPPUConnects:0]            LastArrivalData;
signal [Log2NumPPUConnects:0]            LastArrivalResult;
FOR i from 1 to (NumPPUConnects-1) increment 1
Result[i]   = (RInVal[i]) ? RIn[i]    : iRIn[i];
Sequence[i] = (RInVal[i]) ? RInSeq[i] : iRInSeq[i];
ENDLOOP
PROCESS (on rising edge of Clk) : VALUE_LATCH_PROCESS
 IF Rst is high
     assign initial value to iRInVal
     assign initial value to iMIn
 ELSE
     // latch value for I/F
     FOR i from 1 to (NumPPUConnects-1) increment 1
         IF(RInVal[i] == 1)
             iRInVal[i]  <= RInVal[i];
             iMIn[i]     <= MIn[i];
             iRIn[i]     <= RIn[i];
             iRInSeq[i]  <= RInSeq[i];
         ENDIF
     ENDLOOP
 ENDIF
ENDPROCESS
// latch all the signals to start processing
// process if all I/F have given valid data
PROCESS (on rising edge of Clk) : DATA_SELECTION_MUX_PROCESS
 IF Rst is high
     assign initial value to ROutAVal
     assign initial value to ROutBVal
     assign initial value to ROutDVal
     assign initial value to DValOut
     assign initial value to SOHOut
     assign initial value to EOHOut
     assign initial value to DOut
     assign initial value to StartOutputData
 ELSE
     //default
     assign default value to ROutAVal
     assign default value to ROutBVal
```

```
            assign default value to ROutDVal
            assign default value to DValOut
            assign default value to SOHOut
            assign default value to EOHOut
            // if all I/F have given valids
            IF   (RInVal OR iRInVal) expression is all ones
                IF  user defined @MATCH_Expression_A is true
                    ROutAVal <= 1;
                ELSE IF user defined @MATCH_Expression_B is true
                    ROutBVal <= 1;
                ELSE
                    ROutDVal <= 1;
                ENDIF
                Clear all latched values on iRInVal, iMIn
                // start the transfer of data
                set StartOutputData & SequenceCheck to One
                Latch the port which gave the data last
            ENDIF
            // start ouputing data
            IF    (RInVal are received by each connected PPU) OR ( StartOutputData
    is set )
                IF (RInVal OR iRInVal) expression is all ones
                    set LastArrivalData to the channel which gave last RInVal
                ENDIF
                // output data
                DValOut  = DValIn[LastArrivalData];
                SOHOut   = SOHIn[LastArrivalData];
                EOHOut   = EOHIn[LastArrivalData];
                DOut     = DIn[LastArrivalData];
            endif
              // clear the StartOutputData on EOP
              IF valid EOHOut is received
                reset StartOutputData to zero
              ENDIF
        ENDIF
      ENDPROCESS // latch all the signals to start processing
// process if all I/F have given valid data
PROCESS (on rising edge of Clk) : RESULT_GENERATION_PROCESS
  IF Rst is high
        assign initial value to ROut
        assign initial value to SOut
        assign initial value to OutOfSeqErr
        assign initial value to SequenceCheck
  ELSE
        //default
        assign default value to OutOfSeqErr
        assign default value to SequenceCheck
            // start ouputing data
            IF   (RInVal are received by each connected PPU) OR ( StartOutputData
    is set )
                IF (RInVal OR iRInVal) expression is all ones
                    set LastArrivalResult to the channel which gave last RInVal
                ENDIF
```

```
              IF     (@MATCH_Expression_A) ROut = @Result_Expression_A;
              ELSE IF(@MATCH_Expression_B) ROut = @Result_Expression_B;
              ELSE                         ROut = @Result_Expression_D;
              ENDIF
              SOut = RInSeq[LastArrivalResult];
          ENDIF
          //OutOfSeqErr
          IF ( (SequenceCheck ACTIVE) AND
               (ANY OF THE RECEIVED SEQUENCE NUMBER DO NOT MATCH)
             )
             declare OutOfSeqErr to be active
          ENDIF
      ENDIF
   ENDPROCESS
// out alingment process
PROCESS (on rising edge of Clk) : OUTPUT_ALINGMENT_PROCESS_PROCESS
   IF Rst is low
       IF Result output delay is more
           reclock to align with the result outputs ROutAVal
           reclock to align with the result outputs ROutBVal
           reclock to align with the result outputs ROutDVal
           reclock to align with the result outputs DValOut
           reclock to align with the result outputs SOHOut
           reclock to align with the result outputs EOHOut
           reclock to align with the result outputs DOut
       ENDIF
       IF Data output delay is more
           reclock to align with the result outputs ROut
           reclock to align with the result outputs SOut
       ENDIF
    ENDIF
 ENDPROCESS
// register map
PROCESS (on rising edge of Clk) : REGISTER_MAP_PROCESS
   IF Rst is high
      assign initial value to MapRdData
   ELSE
      // case address decoding
      IF user requested a read (MapWrRd_n == 0)
         CASE (MapAddr)
           // PPU ID read only
           0:  MapRdData = DFUID;
         ENDCASE
      ENDIF
   ENDIF
 ENDPROCESS
```

APPENDIX C

```
// ------------------------------------------------------------
// ------------------------------------------------------------
// This file contains generic packet modification unit block (PMU)
// ------------------------------------------------------------
// ------------------------------------------------------------
Object PMU
PARAMETERS (
// configuration parameter
 DataWidth         = @EQ(DataWidth);
 Log2DataWidth     = @L2(DataWidth);
 MaxHdrWords       = @EQ(MaxHdrWords);
 Log2MaxHdrWords   = @L2(MaxHdrWords);
 ResultWidth       = @L2(MaxHdrWords*(DataWidth/8));
 FieldWidth        = @EQ(MaxHdrWords*DataWidth);
 FieldValidWidth   = @EQ(MaxHdrWords*DataWidth/8);
 TAGBits           = @EQ(TAGBits);
 SobBits           = @EQ(SobBits);
 EobBits           = @EQ(EobBits);
 MaxPktSize        = 16;
 PIUID             = @EQ(PIUID);
 IndexWidth        = Log2DataWidth+Log2MaxHdrWords;
)
INTERFACES(
  // clock & reset
  input                           Rst;
  input                           Clk;
  // input packet header
  input                           InVal;
  input  [SobBits-1:0]            SOHIn;
  input  [EobBits-1:0]            EOHIn;
  input  [DataWidth-1:0]          DataIn;
  // output packet header
  output                          OutVal;
  output [SobBits-1:0]            SOHOut;
  output [EobBits-1:0]            EOHOut;
  output [DataWidth-1:0]          DataOut;
  input  [MaxPktSize-1:0]         HdrByteOffset;
  input  [FieldValidWidth-1:0]    HdrByteVal;
  input  [FieldWidth-1:0]         HdrData;
  //if_generate (TAGBits!=0)
  input  [TAGBits-1:0]            TAGIn;
  output [TAGBits-1:0]            TAGOut;
  //end_generate
  // Micro-processor bus
  input                           MapWrRd_n;
  input  [3:0]                    MapAddr;
  input  [31:0]                   MapWrData;
  output [31:0]                   MapRdData;
  // Result values
  output                          ResVal;

output [ResultWidth-1:0]        Result;
  //if_generate (GenSeq==0)
  input  [7:0]                    SeqIn;
  //end_generate
  output [7:0]                    SeqOut;
);
```

```
{
// internal signals
signal    [DataWidth-1:0]           HdrWord    [MaxHdrWords-1:0];
signal    [(DataWidth/8)-1:0]       HdrWordMod[MaxHdrWords-1:0]; // full
mod i.e. Zero == No bytes valid
FOR i from 0 to (MaxHdrWords-1) increment by One
    j             = (MaxHdrWords-i-1);
    HdrWord[j]    = HdrData   [((i+1)*DataWidth)-1    : (i*DataWidth)];
    HdrWordMod[j] = HdrByteVal[((i+1)*(DataWidth/8))-1: (i*(DataWidth/8))];
ENDLOOP
///////////////////////////////////////////////////////
// internal signals
///////////////////////////////////////////////////////
signal    [(DataWidth/8)-1:0]     InVal_i;
signal    [SobBits-1:0]           InSop_i;
signal                            InSop_1;
signal    [EobBits-1:0]           InEop_i;
signal    [DataWidth-1:0]         InDat_i;
signal                            InVal_r [MaxHdrWords-1:0];
signal    [SobBits-1:0]           InSop_r [MaxHdrWords-1:0];
signal    [EobBits-1:0]           InEop_r [MaxHdrWords-1:0];
signal    [DataWidth-1:0]         InDat_r [MaxHdrWords-1:0];
signal    [Log2MaxHdrWords:0]     HdrExtState;
signal    [MaxHdrWords:0]         HdrState;
constant                          XfrData = MaxHdrWords;
signal    [EobBits-1:0]                              InEop_r_MaxHdrWords =
InEop_r[MaxHdrWords-1];
signal    [@L2(DataWidth/8)  :0]  BytesInWord = 1<<@L2(DataWidth/8);
signal    [MaxPktSize-1:0]        CurPktIndex;
// Special purpose signalisters for the MLU Blocks for custom instruction
signal [31:0]                     SPsignal_0;
signal [31:0]                     SPsignal_1;
signal [31:0]                     SPsignal_2;
signal [31:0]                     SPsignal_3;
FOR i from 0 to (MaxHdrWords-1) increment by One
    HdrState[i] = i;
ENDLOOP
enum      OpCodesType { Opr_Ins, Opr_Mod, Opr_Rem };
OpCodesType OpCode;
PROCESS (on rising edge of Clk)
    IF Rst is high
        assign reset values to HdrExtState
        assign reset values to InVal_i
        assign reset values to InSop_i
        assign reset values to InSop_1
        assign reset values to InEop_i
        assign reset values to InDat_i
        assign reset values to Result
        assign reset values to CurPktIndex
        //if_generate (TAGBits!=0)
        assign reset values to TAGOut
        //end_generate
    ELSE
        // counter for word positions
        Reset, Increment & Clear CurPktIndex based on InSop. InEop & InVal
        IF InVal is active
        CASE (OpCode)
          Opr_Ins       : // Insertion
            IF CurPktIndex < HdrByteOffset
```

```
                    InVal_i = InVal;
                    InDat_i = InDat;
                ELSE IF CurPktIndex == HdrByteOffset OR in range of the bytes
        to be inserted
                    InVal_i = HdrByteVal;
                    InDat_i = HdrData;
                ELSE
                    InVal_i = InVal_r[Adjusted OFFSET based on no of bytes
        inserted];
                    InDat_i = InDat_r[Adjusted OFFSET based on no of bytes
        inserted];
                ENDIF
              Opr_Mod      : // Modification
                IF CurPktIndex < HdrByteOffset
                    InVal_i = InVal;
                    InDat_i = InDat;
                ELSE IF CurPktIndex == HdrByteOffset OR in range of the bytes
        to be modified
                    InVal_i = HdrByteVal;
                    InDat_i = HdrData;
                ELSE
                    InVal_i = InVal;
                    InDat_i = InDat;
                ENDIF
              Opr_Rem      : // Removal
                IF CurPktIndex < HdrByteOffset
                    InVal_i = InVal;
                    InDat_i = InDat;
                ELSE IF CurPktIndex == HdrByteOffset OR in range of the bytes
        to be deleted
                    InVal_i = 0;
                ELSE
                    InVal_i = InVal;
                    InDat_i = InDat;
                ENDIF
              ENDCASE
            ENDIF
        ENDIF // clock
    ENDPROCESS // always
    // Pipe-Line Stage
    PROCESS (on rising edge of Clk)
      create pipline relcock for signals InVal_r
      create pipline relcock for signals InSop_r
      create pipline relcock for signals InEop_r
      create pipline relcock for signals InDat_r
    ENDPROCESS
    OutVal = InVal_i;
    SOHOut = InSop_i;
    EOHOut = InEop_i;
    DataOut= InDat_i;
    ResVal = OutVal AND SOHOut;
    // out alingment process
    PROCESS (on rising edge of Clk) : OUTPUT_ALINGMENT_PROCESS_PROCESS
      IF Rst is low
          IF Result output delay is more
              reclock to align with the result outputs OutVal
              reclock to align with the result outputs SOHOut
              reclock to align with the result outputs EOHOut
              reclock to align with the result outputs DataOut
```

```
            ENDIF
          IF Data output delay is more
              reclock to align with the result outputs ResVal
              reclock to align with the result outputs Result
          ENDIF
      ENDIF
  ENDPROCESS
//
//*********************************************************************
//*********
// sequence out process
PROCESS (on rising edge of Clk): SEQUENCE_GENERATION
    IF Rst is high
        assign reset values to SeqOut
    ELSE
        //if_generate (GenSeq==0)
        IF valid SOHIn is recieved
            set SeqOut equal to SeqIn
        ENDIF
        //else_generate
        // increment the sequence no if valid InSOH is detected
        IF valid SOHIn is recieved
            increment SeqOut by one
        ENDIF
        //end_generate
    ENDIF
  ENDPROCESS
//
//*********************************************************************
//*********
// Register map
//
//*********************************************************************
//*********
// register map process
PROCESS (on rising edge of Clk): REGISTER_MAP
    IF Rst is high
        assign reset values to  MapRdData
        assign reset values to  OpCode (i.e. Opcode present)
        assign reset values to  SPsignal_0
        assign reset values to  SPsignal_1
        assign reset values to  SPsignal_2
        assign reset values to  SPsignal_3
    ELSE
        // case address decoding
        IF map write is requested MapWrRd_n==1
            CASE (MapAddr)
              // PIU ID NO Write
              1: OpCode      = MapWrData;
              4: SPsignal_0  = MapWrData;
              5: SPsignal_1  = MapWrData;
              6: SPsignal_2  = MapWrData;
              7: SPsignal_3  = MapWrData;
            ENDCASE
        // if reading
        else
            CASE (MapAddr)
              // PIU ID read only
              0: MapRdData = PIUID;
```

```
                4: MapRdData = SPsignal_0;
                5: MapRdData = SPsignal_1;
                6: MapRdData = SPsignal_2;
                7: MapRdData = SPsignal_3;
            ENDCASE
          ENDIF
      ENDIF
ENDPROCESS

}
```

APPENDIX D

```
// ------------------------------------------------------------------
// This file contains generic hardware look-up unit (header extraction
block) (HLU)
// ------------------------------------------------------------------
// ------------------------------------------------------------------
Object HLU
PARAMETERS  (
  NoOfLookups      = @EQ(NoOfLookups);
  SobBits          = @EQ(SobBits);
  EobBits          = @EQ(EobBits);
  DataBits         = @EQ(DataBits);
  Log2DataBits     = @L2(DataBits);
  MaxHdrWords      = @EQ(MaxHdrWords);
  Log2MaxHdrWords  = @L2(MaxHdrWords);
  PartSize         = @EQ(PartSize);
)
INTERFACES(
// reset and clock
input                         Rst;
input                         Clk;
// decoding rules
input  [Log2MaxHdrWords:0]  WordNo      [NoOfLookups -1:0];
input  [Log2DataBits-1:0]   StartIndex  [NoOfLookups -1:0];
// input data
input                         InVal;
input  [SobBits-1:0]         InSob;     // Top bit is SOP
input  [EobBits-1:0]         InEob;     // Top bit is EOP
input  [DataBits-1:0]        InDat;
// Decoded Header Values
output                        HdrValid [NoOfLookups -1:0];
output [PartSize-1:0]        HdrValue [NoOfLookups -1:0];
// output data
output                        OutVal;
output [SobBits-1:0]         OutSob;
output [EobBits-1:0]         OutEob;
output [DataBits-1:0]        OutDat;
);
{
// configuration parameter
////////////////////////////////////////////////////////////
// internal signals
////////////////////////////////////////////////////////////
signal    [Log2MaxHdrWords:0]      HdrWordCntr;
PROCESS (on rising edge of Clk)

IF Rst is high
        assign initial value to HdrValid
        assign initial value to HdrValid
        assign initial value to HdrValue
        assign initial value to HdrWordCntr
      // reset
    ELSE // get header word counter ticking
```

```
            IF InVal is high
                // EOP seen
                IF InEob is high
                    set HdrWordCntr to zero
                ELSE IF MaxHdrWords is not equal to MaxHdrWords
                    increment HdrWordCntr by one
            ENDIF
            // header extraction loop
            for lp = 0 to (NoOfLookups-1) increment lp by one //IF header word is reached and data is valid
                IF current word is valid header word
                    // issue valid word indication command
                    declare HdrValid[lp] valid
                    // adjust the data to start index
                    assign HdrValue[lp] to (InDat LEFTSHIFT StartIndex[lp])
                ENDIF
            ENDLOOP
        ENDIF // clock
ENDPROCESS // always
// output assingment
OutVal = InVal;
OutSob = InSob;
OutEob = InEob;
OutDat = InDat;
}
```

APPENDIX E

```
// ----------------------------------------------------
// ----------------------------------------------------
// This file contains generic Match/Lookup Unit (MLU)
// ----------------------------------------------------
// ----------------------------------------------------
Object MLU
PARAMETERS  (
  FieldWidth            = @EQ(FieldWidth);
  Log2FieldWidth        = @L2(FieldWidth);
  LookupAvaliable       = @EQ(LookupAvaliable);
  LookupDepth           = @EQ(LookupDepth);
  Log2LookupDepth       = @L2(LookupDepth);
  NoParallelLookup      = @EQ(NoParallelLookup);
  Log2NoParallelLookup  = @L2(NoParallelLookup);

)
INTERFACES(
  // reset and clock
  input                           Rst;
  input                           Clk;
  // control signals
  input                           QEnable;
  input   [2:0]                   Opcode;
  input   [Log2FieldWidth:0]      Width;
  input   [FieldWidth-1:0]        Param1;
  input   [FieldWidth-1:0]        Param2;
  input                           LkWrEnb;
  input   [Log2LookupDepth-1:0]   LkWrAddr;
  input   [FieldWidth-1:0]        LkWrData;
  output  [FieldWidth-1:0]        LkWrRBData;
  input   [31:0]                  SPReg_0;
  input   [31:0]                  SPReg_1;
  input   [31:0]                  SPReg_2;
  input   [31:0]                  SPReg_3;
  // input check values
  input                           InVal;
  input   [FieldWidth-1:0]        InData;
  input   [FieldWidth-1:0]        InMask;
  // results
  output                          OutVal;
  output                          OutMatch;
);
{
// internal block generateion
signal  [Log2LookupDepth-1:0]    LkRdAddr;
//if_generate (NoParallelLookup < 2)
signal  [FieldWidth-1:0]         LkRdData;
//else_generate
signal  [FieldWidth-1:0]         LkRdData [NoParallelLookup-1:0];
//end_generate
signal  [FieldWidth-1:0]         iLkWrRBData;
signal                           LkInStart;
signal                           LkInProgress;

signal                           LnkProcessState;
constant                         Idle  = 1'b0;
constant                         Check = 1'b1;
```

```
//if_generate (LookupAvaliable == 1)
        //if_generate (NoParallelLookup < 2)
        // TEMPLATE CLASS instantiation for SramR1RW1
        SramR1RW1
        (
            Log2LookupDepth,
            FieldWidth
        )
        SramR1W1_NameInstance
        (
        // Write I/F with Readback option
        Clk, LkWrEnb, LkWrAddr, LkWrData, LkWrRBData,
        // Read only I/F
        Clk, 1'b1, LkRdAddr, LkRdData
        );
        //else_generate
        // if no of parallel I/F more than 1
        signal   [NoParallelLookup-1:0]           LkWrEnb_@i  =   LkWrEnb  &
(LkWrAddr[Log2LookupDepth-1:Log2LookupDepth-Log2NoParallelLookup]          ==
@EQ(i));
        signal [FieldWidth-1:0]   LkWrRBData  [NoParallelLookup-1:0];
        // enable and address upper bits are for the RAM
        FOR i from 1 to (NoParallelLookup-1) increment 1
           LkWrEnb[i]      =       LkWrEnb     &      (LkWrAddr[Log2LookupDepth-
1:Log2LookupDepth-Log2NoParallelLookup] == i );
        ENDLOOP
        //for_generate @i (NoParallelLookup)
        SramR1RW1
        (
            (Log2LookupDepth-Log2NoParallelLookup),
            FieldWidth
        )
        SramR1W1_NameInstance_@i
        (
        // Write I/F with Readback option
        Clk, LkWrEnb[@EQ(i)], LkWrAddr, LkWrData, LkWrRBData,
        // Read only I/F
        Clk, 1'b1, LkRdAddr, LkRdData[@EQ(i)]
        );
        //end_generate
        //end_generate
//end_generate
// adjust the comparision to the width user requested
// The actual process
PROCESS (on rising edge of Clk)
    IF Rst is high
        assign reset values to OutVal assign reset values to OutMatch
        assign reset values to LkInStart
        assign reset values to LkInProgress
        assign reset values to LnkProcessState
    ELSE
        //default
        Clear OutVal & LkInStart // if the Match unit is enabled than try to do something
        IF QEnable is active high
            CASE (Opcode)
```

```
                        3'd0 :  //   EQ:   Equal to Param1
                              IF InVal observed
                                    OutVal       = 1;
                                    OutMatch     = ((InData & InMask) == (Param1 &
InMask)));
                              ENDIF
                        3'd1 :  //   LT:   Less Than Param1
                              IF InVal observed
                                    OutVal       = 1;
                                    OutMatch     = ((InData & InMask) < (Param1 &
InMask)));
                              ENDIF
                        3'd2 :  //   LE:   Less Than or Equal to Param1
                              IF InVal observed
                                    OutVal       = 1;
                                    OutMatch     = ((InData & InMask) = (Param1 &
InMask)));
                              ENDIF
                        3'd3 :  //   GT:   Greater Than Param1
                              IF InVal observed
                                    OutVal       = 1;
                                    OutMatch     = ((InData & InMask) > (Param1 &
InMask)));
                              ENDIF
                        3'd4 :  //   GE:   Greater Than or Equal to Param1
                              IF InVal observed
                                    OutVal       = 1;
                                    OutMatch     = ((InData & InMask) >= (Param1 &
InMask)));
                              ENDIF
                        3'd5 :  //   RNG:  Check if within range <Param1,Param2>
                              IF InVal observed
                                    OutVal       = 1;
                                    OutMatch     = ( ((InData & InMask) >= (Param1 &
InMask)) && ((InData & InMask) = (Param2 & InMask)));
                              ENDIF
                        3'd6 :  //   LUP:  Look up
                              IF InVal observed
                                    IF LookupAvaliable is active
                                          OutVal       = 1;
                                          OutMatch     = 1;
                                          // start lookup if the module is enabled for look
up
                                    ELSE
                                          LkInStart    = 1;
                                    ENDIF
                              end
                        3'd7:   //   EXTR: Extract
                              IF InVal observed
                                    OutVal       = 1;
                                    OutMatch     = @EXTR_Expression;
                              ENDIF
                        default :
                              IF InVal observed
                                    OutVal       = 1;
                                    OutMatch     = 1;
                              ENDIF
                  ENDCASE
            //else jut return okay
```

```
                ELSE IF InVal observed
                    OutVal      = 1;
                    OutMatch    = 0;
                ENDIF
            //if_generate (LookupAvaliable == 1)
            // process a lookup query
            case (LnkProcessState)
                Idle:
                    // clear Look up in progress begin
                    LkInProgress = 0;
                    // start processing
                    if(LkInStart == 1)
                        LkRdAddr        = 0;
                        LkInProgress    = 1;
                        LnkProcessState = Check;
                    ENDIF
                Check:
                    // declare match and exit the search
                    //if_generate (NoParallelLookup < 2)
                    IF ((InData & InMask) == (LkRdData & InMask))
                    //else_generate
                    IF(
                    //for_generate @i (NoParallelLookup)
                    @IS(i==0)?():(        ||   )((InData   &   InMask)   ==   (
LkRdData[@EQ(i)] & InMask))
                    //end_generate
                    )
                    //end_generate
                        OutVal          = 1;
                        OutMatch        = 1;
                        LkInProgress    = 0;
                        LnkProcessState = Idle;
                    // if lookup limit reached
                    ELSE IF address limit reached without match
                        OutVal          = 1;
                        OutMatch        = 0;
                        LkInProgress    = 0;
                        LnkProcessState = Idle;
                    // lookup address increment
                    ELSE
                        increment  LkRdAddr  by  appropriate  value  based  on
NoParallelLookup
                    ENDIF
            ENDCASE
            //end_generate
    ENDIF
 ENDPROCESS
}
```

APPENDIX F

Veriloop2

```
// global variables
declare        line_count = 0, input_filename, output_filename;
declare map    ParamNum;
declare map    ParamStr;
// ***************************************************
void error()
{
    Print appropriate error message;
    exit;
}
int Log2(int n)
{
    int l;
    for(l=1,n--; n>1; n=n>>1, l++);
    return l;
}
int Expression(string e)
{
   declare tmpstr;
   tmpstr = e;
   for each s variable in string
     {
        FIND the corresponding value s from ParamNum, ParamStr maps;
        REPLACE s by value of s in tmpstr;
     }
   // unix or cygwin environment is required for bash script
   CALL bash expression evaluator and pass it tmpstr;
   return result from bash expression evaluator;
}
string VeriLoop2(FILE in_file)
{
    declare  buffsize = 1024,  buffer[buffsize],  word[buffsize],  frame, Match;
    declare loop_count;
    while  END of input file is reached
    {
        GET LINE from file into buffer;
        GET first word from buffer into word;
        if(word == "@L2(" )
        {
           GET next word from buffer;
           Append Log2(word) to frame;
           SKIP ")" from input file;
        }
        if(word == "@EQ(" )
        {
           GET next word from buffer;
           Append Expression(word) to frame;
           SKIP ")" from input file;
        }
        if(word == "//if_generate")
        {
            get Expression following "//if_generate" into buffer;
```

```
            if(Expression(buffer, i)==1)
            {
               do {
                  GET LINE from file into buffer;
                  frame = frame + buffer ;
               }while (buffer != "//end_generate")
            }
            //Don't store generate this piece of code
            else
            {
               do {
                  GET LINE from file into buffer;
                  if(word == "//elseif_generate")
                  {
                     get Expression following "//if_generate" into buffer;
                     if(Expression(buffer, i)==1)
                     {
                        do {
                           GET LINE from file into buffer;
                           frame = frame + buffer ;
                        }while (buffer != "//end_generate")
                        break;
                     }
                  }
                  // do not add to frame
               }while (buffer != "//end_generate")
            }
         }
         else if(word == "//let_generate" ) //let_generate @VariableName1
(expression)
                                                           //let_generate
@VariableName2 "string"
         {
            // create new variable
            GET name value pair from the following two variables;
            Populate ParamNum, ParamStr using the name value pair;
         }
         else if(word == "//for_generate" )
         {
            // do (expression) number of iterations of the code,
            // replacing  every  occurence  of  @index_char  with  iteration
index
            // [0; (expression)-1]
            GET loop_count from the next word following "//for_generate";
            GET    buffer    from    lines    between    "//for_generate"    and
corresponding "//end_generate";
            for(i=0; i<loop_count; i++)
            {
               REPLACE reference to loop variable in buffer with i;
               APPEND buffer to frame;
            }
         }
         else
         {
            // pass through the line to buffer
            APPEND buffer to frame;
         }
}// while
return frame;
```

```
}// veriloop2
int main()
{
    declare FILE out_file, in_file, ini_file;
    declare buffer, key, i, k;
    Get input filename from global buffer into input_filename;
    // open input file
    in_file  = file_open(input_filename);
    Get input filename from global buffer into output_filename;
    // open output file
    out_file = file_open(output_filename);
    // read in parameters from input line
    for remaining parameter on the command line
    {
      if string consists of '='
      {
         GET name value pair <PARAM>=<VALUE>;
         Populate ParamNum, ParamStr using the name value pair;
      }
      else
      {
         error();
      }
    }
    // process source file
    buf = VeriLoop2(in_file);
    // output processed string to file
    output buf to file out_file;
    // close files
    file_close(in_file);
    file_close(out_file);
}
```

APPENDIX G

Supported Constructs

1. Value replace construct specified by:
   @EQ(RValue)
   which is replaced by the value of the RValue
2. For generate construct specified by:
   //for_generate @var (loopvalue)
   code needed to be generated loopvalue times
   //end_generate
3. If generate construct specified by:
   //if_generate (condition1)
   code needed to be generated if condition1 is true
   //else_if_generate (conditionN) – optional
   code needed to be generated if conditionN is true
   //else_generate – optional
   code needed to be generated if none of the above condition match
   //end_generate
4. Is generate construct specified by:
   @IS(Condition)?(ValueIFTrue):(ValueIFFalse)
   which is replaced by ValueIFTrue if Condition is true else replaced by ValueIFFalse

APPENDIX H

```
// -----------------------------------------------------------------
// -----------------------------------------------------------------
// This file contains decision forwarding unit (DFU_1)
// -----------------------------------------------------------------
// -----------------------------------------------------------------

Object DFU
PARAMETERS (
// configuration constant
DataWidth            = 32;
InResultWidth        = 8;
OutResultWidth       = 8;
NumPPUConnects       = 1;
Log2NumPPUConnects   = 1;
DFUID                = 0;
SopBits              = 1;
EopBits              = 4;
)
INTERFACES(
 // clock & reset
input                                   Rst;
input                                   Clk;

// Micro-processor bus
input                                   MapWrRd_n;
input    [2:0]                          MapAddr;
input    [31:0]                         MapWrData;
output   [31:0]                         MapRdData;

// input buses
input    [NumPPUConnects-1:0]           RInVal;
input    [NumPPUConnects-1:0]           MIn;
input    [InResultWidth-1:0]            RIn_0;
input    [7:0]                          RInSeq_0;
// in packet header
input    [NumPPUConnects-1:0]           DValIn;
input    [SopBits-1:0]                  SOHIn_0;
input    [EopBits-1:0]                  EOHIn_0;
input    [DataWidth-1:0]                DIn_0;

// out result
output                                  ROutAVal;
output                                  ROutBVal;
output                                  ROutDVal;
output   [OutResultWidth-1:0]           ROut;
output   [7:0]                          SOut;

// out packet header common
output                                  DValOut;
output   [SopBits-1:0]                  SOHOut;
output   [EopBits-1:0]                  EOHOut;
output   [DataWidth-1:0]                DOut;

output                                  OutOfSeqErr;
);
```

```
(
// internal signals
signal                              StartOutputData;
signal                              SequenceCheck;
signal [NumPPUConnects-1:0]         iRInVal;
signal [NumPPUConnects-1:0]         iMIn;
signal [InResultWidth-1:0]          iRIn    [NumPPUConnects-1:0];
signal [7:0]                        iRInSeq [NumPPUConnects-1:0];

signal  [InResultWidth-1:0]   RIn      [NumPPUConnects-1:0];
signal  [7:0]                 RInSeq[NumPPUConnects-1:0];
signal  [SopBits-1:0]         SOHIn    [NumPPUConnects-1:0];
signal  [EopBits-1:0]         EOHIn    [NumPPUConnects-1:0];
signal  [DataWidth-1:0]       DIn      [NumPPUConnects-1:0];

RIn     [0]  =  RIn_0;
RInSeq[0]    =  RInSeq_0;
SOHIn   [0]  =  SOHIn_0;
EOHIn   [0]  =  EOHIn_0;
DIn     [0]  =  DIn_0;

signal [NumPPUConnects-1:0]    Match = MIn OR iMIn;
signal [InResultWidth-1:0]     Result   [NumPPUConnects-1:0];
signal [7:0]                   Sequence [NumPPUConnects-1:0];

signal [Log2NumPPUConnects:0]  LastArrivalData;
signal [Log2NumPPUConnects:0]  LastArrivalResult;

FOR i from 1 to (NumPPUConnects-1) increment 1
Result[i]   = (RInVal[i]) ? RIn[i]    : iRIn[i];
Sequence[i] = (RInVal[i]) ? RInSeq[i] : iRInSeq[i];
ENDLOOP PROCESS (on rising edge of Clk) : VALUE_LATCH_PROCESS
  IF Rst is high
      assign initial value to iRInVal
      assign initial value to iMIn ELSE
      // latch value for I/F
      FOR i from 1 to (NumPPUConnects-1) increment 1
         IF(RInVal[i] == 1)
            iRInVal[i]  <= RInVal[i];
            iMIn[i]     <= MIn[i];
            iRIn[i]     <= RIn[i];
            iRInSeq[i]  <= RInSeq[i];
         ENDIF
      ENDLOOP

ENDIF
ENDPROCESS

// latch all the signals to start processing
// process if all I/F have given valid data
PROCESS (on rising edge of Clk) : DATA_SELECTION_MUX_PROCESS
```

```
IF Rst is high
    assign initial value to ROutAVal
    assign initial value to ROutBVal
    assign initial value to ROutDVal
    assign initial value to DValOut
    assign initial value to SOHOut
    assign initial value to EOHOut
    assign initial value to DOut
    assign initial value to StartOutputData ELSE
    //default
    assign default value to ROutAVal
    assign default value to ROutBVal
    assign default value to ROutDVal
    assign default value to DValOut
    assign default value to SOHOut
    assign default value to EOHOut // if all I/F have given valids
    IF  (RInVal OR iRInVal) expression is all ones
        IF  user defined Match[0] is true
            ROutAVal <= 1;
        ELSE IF user defined Match[0] is true
            ROutBVal <= 1;
        ELSE
            ROutDVal <= 1;
        ENDIF
        Clear all latched values on iRInVal, iMIn
        // start the transfer of data
        set StartOutputData & SequenceCheck to One
        Latch the port which gave the data last
    ENDIF // start ouptuting data
        IF   (RInVal are received by each connected PPU) OR ( StartOutputData
is set )
            IF (RInVal OR iRInVal) expression is all ones
                set LastArrivalData to the channel which gave last RInVal
            ENDIF
            // output data
            DValOut  = DValIn[LastArrivalData];
            SOHOut   = SOHIn[LastArrivalData];
            EOHOut   = EOHIn[LastArrivalData];
            DOut     = DIn[LastArrivalData];

endif

// clear the StartOutputData on EOP
        IF valid EOHOut is received
          reset StartOutputData to zero
        ENDIF

ENDIF
ENDPROCESS
```

```
// latch all the signals to start processing
// process if all I/F have given valid data
PROCESS (on rising edge of Clk) : RESULT_GENERATION_PROCESS
 IF Rst is high
      assign initial value to ROut
      assign initial value to SOut
      assign initial value to OutOfSeqErr
      assign initial value to SequenceCheck ELSE
     //default
     assign default value to OutOfSeqErr
     assign default value to SequenceCheck // start ouptuting data
     IF   (RInVal are received by each connected PPU) OR ( StartOutputData
is set )
         IF (RInVal OR iRInVal) expression is all ones
            set LastArrivalResult to the channel which gave last RInVal
         ENDIF IF     (Match[0])  ROut = Result[0];
         ELSE IF(Match[0])  ROut = Result[0];
         ELSE                          ROut = 0;
         ENDIF
         SOut = RInSeq[LastArrivalResult];

ENDIF

//OutOfSeqErr
     IF ( (SequenceCheck ACTIVE) AND
          (ANY OF THE RECEIVED SEQUENCE NUMBER DO NOT MATCH)
        )
        declare OutOfSeqErr to be active
     ENDIF

ENDIF
ENDPROCESS

// out alingment process
PROCESS (on rising edge of Clk) : OUTPUT_ALINGMENT_PROCESS_PROCESS
 IF Rst is low
     IF Result output delay is more
         reclock to align with the result outputs ROutAVal
         reclock to align with the result outputs ROutBVal
         reclock to align with the result outputs ROutDVal
         reclock to align with the result outputs DValOut
         reclock to align with the result outputs SOHOut
         reclock to align with the result outputs EOHOut
         reclock to align with the result outputs DOut
     ENDIF
     IF Data output delay is more
         reclock to align with the result outputs ROut
         reclock to align with the result outputs SOut
```

```
        ENDIF
    ENDIF
  ENDPROCESS

// register map
PROCESS (on rising edge of Clk) : REGISTER_MAP_PROCESS
  IF Rst is high
    assign initial value to MapRdData
  ELSE
    // case address decoding
    IF user requested a read (MapWrRd_n == 0)
      CASE (MapAddr)
        // PPU ID read only
        0:  MapRdData = DFUID;
      ENDCASE
    ENDIF
  ENDIF
ENDPROCESS

)
```

APPENDIX I

```
// ----------------------------------------------------------
// ----------------------------------------------------------
// This file contains decision forwarding unit (DFU_4)
// ----------------------------------------------------------
// ----------------------------------------------------------

Object DFU
PARAMETERS (
// configuration constant
DataWidth              = 32;
InResultWidth          = 8;
OutResultWidth         = 8;
NumPPUConnects         = 4;
Log2NumPPUConnects     = 2;
DFUID                  = 0;
SopBits                = 1;
EopBits                = 4;
)
INTERFACES(
 // clock & reset
input                            Rst;
input                            Clk;

// Micro-processor bus
input                            MapWrRd_n;
input    [2:0]                   MapAddr;
input    [31:0]                  MapWrData;
output   [31:0]                  MapRdData;

// input buses
input    [NumPPUConnects-1:0]    RInVal;
input    [NumPPUConnects-1:0]    MIn;
input    [InResultWidth-1:0]     RIn_0;
input    [7:0]                   RInSeq_0;
input    [InResultWidth-1:0]     RIn_1;
input    [7:0]                   RInSeq_1;
input    [InResultWidth-1:0]     RIn_2;
input    [7:0]                   RInSeq_2;
input    [InResultWidth-1:0]     RIn_3;
input    [7:0]                   RInSeq_3;
// in packet header
input    [NumPPUConnects-1:0]    DValIn;
input    [SopBits-1:0]           SOHIn_0;
input    [EopBits-1:0]           EOHIn_0;
input    [DataWidth-1:0]         DIn_0;
input    [SopBits-1:0]           SOHIn_1;
input    [EopBits-1:0]           EOHIn_1;
input    [DataWidth-1:0]         DIn_1;
input    [SopBits-1:0]           SOHIn_2;
input    [EopBits-1:0]           EOHIn_2;
input    [DataWidth-1:0]         DIn_2;
input    [SopBits-1:0]           SOHIn_3;
input    [EopBits-1:0]           EOHIn_3;
input    [DataWidth-1:0]         DIn_3;
```

```
// out result
output                              ROutAVal;
output                              ROutBVal;
output                              ROutDVal;
output [OutResultWidth-1:0]         ROut;
output [7:0]                        SOut;

// out packet header common
output                              DValOut;
output [SopBits-1:0]                SOHOut;
output [EopBits-1:0]                EOHOut;
output [DataWidth-1:0]              DOut;

output                              OutOfSeqErr;
);
{
// internal signals
signal                              StartOutputData;
signal                              SequenceCheck;
signal [NumPPUConnects-1:0]         iRInVal;
signal [NumPPUConnects-1:0]         iMIn;
signal [InResultWidth-1:0]          iRIn   [NumPPUConnects-1:0];
signal [7:0]                        iRInSeq [NumPPUConnects-1:0];

signal [InResultWidth-1:0]          RIn    [NumPPUConnects-1:0];
signal [7:0]                        RInSeq[NumPPUConnects-1:0];
signal [SopBits-1:0]                SOHIn  [NumPPUConnects-1:0];
signal [EopBits-1:0]                EOHIn  [NumPPUConnects-1:0];
signal [DataWidth-1:0]              DIn    [NumPPUConnects-1:0];

RIn    [0] = RIn_0;
RInSeq[0] = RInSeq_0;
SOHIn  [0] = SOHIn_0;
EOHIn  [0] = EOHIn_0;
DIn    [0] = DIn_0;
RIn    [1] = RIn_1;
RInSeq[1] = RInSeq_1;
SOHIn  [1] = SOHIn_1;
EOHIn  [1] = EOHIn_1;
DIn    [1] = DIn_1;
RIn    [2] = RIn_2;
RInSeq[2] = RInSeq_2;
SOHIn  [2] = SOHIn_2;
EOHIn  [2] = EOHIn_2;
DIn    [2] = DIn_2;
RIn    [3] = RIn_3;
RInSeq[3] = RInSeq_3;
SOHIn  [3] = SOHIn_3;
EOHIn  [3] = EOHIn_3;
DIn    [3] = DIn_3;

signal [NumPPUConnects-1:0]         Match = MIn OR iMIn;
signal [InResultWidth-1:0]          Result   [NumPPUConnects-1:0];
signal [7:0]                        Sequence [NumPPUConnects-1:0];

signal [Log2NumPPUConnects:0]       LastArrivalData;
```

```
signal [Log2NumPPUConnects:0]          LastArrivalResult;

FOR i from 1 to (NumPPUConnects-1) increment 1
Result[i]   = (RInVal[i]) ? RIn[i]    : iRIn[i];
Sequence[i] = (RInVal[i]) ? RInSeq[i] : iRInSeq[i];
ENDLOOP PROCESS (on rising edge of Clk) : VALUE_LATCH_PROCESS
 IF Rst is high
      assign initial value to iRInVal
      assign initial value to iMIn ELSE
      // latch value for I/F
      FOR i from 1 to (NumPPUConnects-1) increment 1
         IF(RInVal[i] == 1)
            iRInVal[i]  <= RInVal[i];
            iMIn[i]     <= MIn[i];
            iRIn[i]     <= RIn[i];
            iRInSeq[i]  <= RInSeq[i];
         ENDIF
      ENDLOOP

ENDIF
ENDPROCESS

// latch all the signals to start processing
// process if all I/F have given valid data
PROCESS (on rising edge of Clk) : DATA_SELECTION_MUX_PROCESS
 IF Rst is high
      assign initial value to ROutAVal
      assign initial value to ROutBVal
      assign initial value to ROutDVal
      assign initial value to DValOut
      assign initial value to SOHOut
      assign initial value to EOHOut
      assign initial value to DOut
      assign initial value to StartOutputData ELSE
      //default
      assign default value to ROutAVal
      assign default value to ROutBVal
      assign default value to ROutDVal
      assign default value to DValOut
      assign default value to SOHOut
      assign default value to EOHOut // if all I/F have given valids
      IF  (RInVal OR iRInVal) expression is all ones
         IF  user defined &Match is true
            ROutAVal <= 1;
         ELSE IF user defined |Match is true
            ROutBVal <= 1;
         ELSE
            ROutDVal <= 1;
         ENDIF
         Clear all latched values on iRInVal, iMIn
```

```
        // start the transfer of data
        set StartOutputData & SequenceCheck to One
        Latch the port which gave the data last
    ENDIF // start ouptuting data
    IF   (RInVal are received by each connected PPU) OR ( StartOutputData
is set )

IF (RInVal OR iRInVal) expression is all ones
            set LastArrivalData to the channel which gave last RInVal
        ENDIF
        // output data
        DValOut   = DValIn[LastArrivalData];
        SOHOut    = SOHIn[LastArrivalData];
        EOHOut    = EOHIn[LastArrivalData];
        DOut      = DIn[LastArrivalData];

endif

// clear the StartOutputData on EOP
        IF valid EOHOut is received
          reset StartOutputData to zero
        ENDIF

ENDIF
 ENDPROCESS

// latch all the signals to start processing
// process if all I/F have given valid data
PROCESS (on rising edge of Clk) : RESULT_GENERATION_PROCESS
 IF Rst is high
     assign initial value to ROut
     assign initial value to SOut
     assign initial value to OutOfSeqErr
     assign initial value to SequenceCheck ELSE
     //default
     assign default value to OutOfSeqErr
     assign default value to SequenceCheck // start ouptuting data
    IF   (RInVal are received by each connected PPU) OR ( StartOutputData
is set )
        IF (RInVal OR iRInVal) expression is all ones
            set LastArrivalResult to the channel which gave last RInVal
        ENDIF IF      (&Match) ROut = Result[0];
        ELSE IF(|Match) ROut = Result[1];
        ELSE                    ROut = 0;
        ENDIF
```

```
                SOut = RInSeq[LastArrivalResult];
        ENDIF

//OutOfSeqErr
        IF ( (SequenceCheck ACTIVE) AND
             (ANY OF THE RECEIVED SEQUENCE NUMBER DO NOT MATCH)
           )
           declare OutOfSeqErr to be active
        ENDIF

ENDIF
  ENDPROCESS

// out alingment process
PROCESS (on rising edge of Clk) : OUTPUT_ALINGMENT_PROCESS_PROCESS
  IF Rst is low
      IF Result output delay is more
          reclock to align with the result outputs ROutAVal
          reclock to align with the result outputs ROutBVal
          reclock to align with the result outputs ROutDVal
          reclock to align with the result outputs DValOut
          reclock to align with the result outputs SOHOut
          reclock to align with the result outputs EOHOut
          reclock to align with the result outputs DOut
      ENDIF
      IF Data output delay is more
          reclock to align with the result outputs ROut
          reclock to align with the result outputs SOut
      ENDIF
  ENDIF
ENDPROCESS // register map
PROCESS (on rising edge of Clk) : REGISTER_MAP_PROCESS
  IF Rst is high
     assign initial value to MapRdData ELSE
     // case address decoding
     IF user requested a read (MapWrRd_n == 0)
        CASE (MapAddr)
          // PPU ID read only
          0:  MapRdData = DPUID;
        ENDCASE
     ENDIF
  ENDIF
ENDPROCESS

)
```

APPENDIX J

```
// ----------------------------------------------------------------
// This file contains Packet Processing Unit(s) (PPU)
// ----------------------------------------------------------------

Object PPU
PARAMETERS (
// configuration constant
DataWidth        = 32;
Log2DataWidth    = 5;
MaxHdrWords      = 8;
Log2MaxHdrWords  = 3;
QualifierWidth   = 2;
ResultWidth      = 8;
FieldWidth       = 16;
Log2FieldWidth   = 4;
LookupAvaliable  = 0;
LookupDepth      = 8;
Log2LookupDepth  = 3;
TAGBits          = 0;
SobBits          = 1;
EobBits          = 4;
UseFIFOStorage   = 0;
PPUID            = 0;
IndexWidth       = Log2DataWidth+Log2MaxHdrWords;

)
INTERFACES(
// Result output expression is  ExtHdrValue
// clock & reset
input                             Rst;
input                             Clk;
// input packet header
input                             InVal;
input   [SobBits-1:0]             SOHIn;
input   [EobBits-1:0]             EOHIn;
input   [DataWidth-1:0]           DataIn;
// output packet header
output                            OutVal;
output  [SobBits-1:0]             SOHOut;
output  [EobBits-1:0]             EOHOut;
output  [DataWidth-1:0]           DataOut;
// control signal
input   [QualifierWidth-1:0]      QualEnb;
input   [2:0]                     QualCond;

input   [IndexWidth-1:0]          Index;
input   [Log2FieldWidth:0]        Width;
input   [2:0]                     Opcode;
input   [FieldWidth-1:0]          Param1;
input   [FieldWidth-1:0]          Param2;
input   [FieldWidth-1:0]          Mask;
// Micro-processor bus
input                             MapWrRd_n;
input   [3:0]                     MapAddr;
input   [31:0]                    MapWrData;
output  [31:0]                    MapRdData;
```

```
// Result values
output                                  Match;
output                                  ResVal;
output  [ResultWidth-1:0]               Result;
output  [7:0]                           SeqOut;
);
{
//****************************************************************
// internal signal decleration
//****************************************************************
signal                                  ExtOutVal;
signal  [SobBits-1:0]                   ExtOutSob;
signal  [EobBits-1:0]                   ExtOutEob;
signal  [DataWidth-1:0]                 ExtOutDat;

signal  [FieldWidth-1:0]                ExtHdrValue;

signal  [IndexWidth-1:0]                AdjustedIndex = Index + Width;

signal                                  ExtHdrValid;
signal                                  ExtHdrValid    [NoOfLookups-1:0];
signal  [DataWidth-1:0]                 ExtHdrValue    [NoOfLookups-1:0];
signal  [Log2MaxHdrWords:0]             WordNo         [NoOfLookups-1:0];
signal  [Log2DataWidth-1:0]             StartIndex     [NoOfLookups-1:0];
signal  [Log2DataWidth-1:0]             DataShift;
constant                                FieldWidthMultiple = (FieldWidth+DataWidth-
1)/DataWidth;

FOR i from 1 to (NoOfLookups-1) increment 1
WordNo[i]    = (Index[IndexWidth-1:Log2DataWidth]+i);
StartIndex[i] = 0;
ENDLOOP signal                                  iOutVal;
signal                                  iOutMatch;
signal                                  QEnable;
signal  [QualifierWidth-1:0]            QualEnbCondition;

signal                                  LkWrEnb;
signal  [Log2LookupDepth-1:0]           LkWrAddr;
signal  [FieldWidth-1:0]                LkWrData;
signal  [FieldWidth-1:0]                LkWrRBData;

// Special purpose registers for the MLU Blocks for custom instruction
signal  [31:0]                          SPReg_0;
signal  [31:0]                          SPReg_1;
signal  [31:0]                          SPReg_2;
signal  [31:0]                          SPReg_3;

signal                                  Match;
constant                                Idle = 0;
constant                                Xfr  = 1;

// TEMPLATE CLASS instantiation for HLU
HLU
(
```

```
    0,
    SobBits, EobBits, DataWidth,
    Log2DataWidth,
    MaxHdrWords, Log2MaxHdrWords,
    DataWidth
)
HeaderExtract_NameInstance
(
    // reset and clock
    Rst, Clk,
    // decoding rules
    WordNo , StartIndex,
    // input data
    InVal, SOHIn, EOHIn, DataIn,
    // Decoded Header Values
    ExtHdrValid, ExtHdrValue,
    // output data
    ExtOutVal, ExtOutSob, ExtOutEob, ExtOutDat
);

// data byte alingment.
PROCESS (on change to ExtHdrValue)

Adjust    ExtHdrValue    with    DataWidth,    FieldWidth    &
AdjustedIndex[Log2DataWidth-1:0] to have\
    the correct byte alingment at byte zero
ENDPROCESS // extract qualifier enable
PROCESS (on rising edge of Clk)
    IF Rst is high
        assign inittal value to QEnable
    ELSE
        set QEnable to disabled state Zero to begin
        // get the case statement for enable
        CASE (QualCond)
            3'd0 : set QEnable to enable state One to Unconditional
            3'd1 : set QEnable to enable state One to if QualEnbCondition
Equal to QualEnb
            3'd2 : set QEnable to enable state One to if QualEnbCondition
Greater than QualEnb
            3'd3 : set QEnable to enable state One to if QualEnbCondition
Greater than or Equal to QualEnb
            3'd4 : set QEnable to enable state One to if QualEnbCondition
Less than QualEnb
            3'd5 : set QEnable to enable state One to if QualEnbCondition not
Equal to QualEnb
            default : QEnable   = 0;
        ENDCASE
    ENDIF
ENDPROCESS // MLU Template class instance
MLU
(       FieldWidth,    Log2FieldWidth,    LookupAvaliable,    LookupDepth,
Log2LookupDepth )
```

```
MLU_NameInstance
(
    // reset and clock
    Rst, Clk,
    // control signals
    QEnable, Opcode, Width, Param1, Param2, LkWrEnb, LkWrAddr, LkWrData,
LkWrRBData,
    SPReg_0, SPReg_1, SPReg_2, SPReg_3,
    // input check values
    ExtHdrValid, ExtHdrValue, Mask,
    // results
    iOutVal, iOutMatch
);

//
//*********************************************************************
//**********
// I/O out signal
    // reclock signals
    signal[Log2MaxHdrWords+2:0]    SelIndex;
    signal                          ExtOutVal_r[MaxHdrWords+2:0];
    signal[SobBits-1:0]             ExtOutSob_r[MaxHdrWords+2:0];
    signal[EobBits-1:0]             ExtOutEob_r[MaxHdrWords+2:0];
    signal[DataWidth-1:0]           ExtOutDat_r[MaxHdrWords+2:0];
    signal                          iResVal;

OutVal  = ExtOutVal_r[SelIndex];
    SOHOut  = ExtOutSob_r[SelIndex];
    EOHOut  = ExtOutEob_r[SelIndex];
    DataOut = ExtOutDat_r[SelIndex];
    Result  = ExtHdrValue;
    ResVal  = iResVal;
    // on reclock will do for no lookup
    PROCESS (on rising edge of Clk); OUTPUT_ALINGEMENT_PROCESS
        IF Rst is high
            assign reset values to iResVal
            assign reset values to Match
            assign reset values to SelIndex
        ELSE
            Reclock  the  signals  ExtOutVal_r,  ExtOutSob_r,  ExtOutEob_r  &
ExtOutDat_r\
            to generate a MaxHdrWords+3 word pipline for future usage
            // default
            set iResVal to Zero IF valid SOHIn is recieved
                // word lookup   + 1 match clock
                Calculate SelIndex based on WordNo of the last lookup
            ENDIF
            // gen expression
            IF  iOutVal is set to high
                declare iResVal to be valid
                set Match as iOutMatch
            ENDIF
        ENDIF
    ENDPROCESS
```

```
//
***************************************************************************
*********
// sequence out process
PROCESS (on rising edge of Clk): SEQUENCE_GENERATION
    IF Rst is high
        assign reset values to SeqOut
    ELSE
        // increment the sequence no if valid InSOH is detected
        IF valid SOHIn is recieved
            increment SeqOut by one
        ENDIF
    ENDIF
 ENDPROCESS
//
***************************************************************************
**********
// Register map
//
***************************************************************************
*********

// register map process
PROCESS (on rising edge of Clk): REGISTER_MAP
    IF Rst is high
        assign   reset   values   to   MapRdData,   QualEnbCondition,   LkWrEnb,
LkWrAddr,\
        LkWrData, SPReg_0, SPReg_1, SPReg_2, SPReg_3,
    ELSE // case address decoding
        IF user requested a write operation
            CASE (MapAddr)
              // PPU ID NO Write // Enable Condition
              1:
                  latch QualEnbCondition from MapWrData
              // map address
              2:
                  latch LkWrAddr from MapWrData
              // map data
              3:
                  issue write to user look table using LkWrEnb
                  latch LkWrData from MapWrData
              4:
                  latch SPReg_0 from MapWrData
              5:
                  latch SPReg_1 from MapWrData
              6:
                  latch SPReg_2 from MapWrData
              7:
                  latch SPReg_3 from MapWrData
            ENDCASE
        // if reading
        ELSE
            CASE (MapAddr)
              // PPU ID read only
              0:
```

```
                set MapRdData to PPUID
        // Enable Condition
        1:
            set MapRdData to QualEnbCondition
        // map address
        // address needs to be set
        // for reading data
        // map data
        3:
            set MapRdData to LkWrRBData
        4:
            set MapRdData to SPReg_0
        5:
            set MapRdData to SPReg_1
        6:
            set MapRdData to SPReg_2
        7:
            set MapRdData to SPReg_3
    ENDCASE
  ENDIF

ENDIF
 ENDPROCESS

}
```

APPENDIX K

```
// ----------------------------------------------------------------
// ----------------------------------------------------------------
// This file contains header extraction block (HLU)
// ----------------------------------------------------------------
// ----------------------------------------------------------------

Object HLU
PARAMETERS  (
  NoOfLookups     = 0;
  SobBits         = 1;
  EobBits         = 4;
  DataBits        = 32;
  Log2DataBits    = 5;
  MaxHdrWords     = 8;
  Log2MaxHdrWords = 3;
  PartSize        = 16;
)
INTERFACES( // reset and clock
input                   Rst;
input                   Clk;

// decoding rules input   [Log2MaxHdrWords:0] WordNo     [NoOfLookups -1:0];
input   [Log2DataBits-1:0]  StartIndex [NoOfLookups -1:0];
// input data
input                   InVal;
input   [SobBits-1:0]   InSob;    // Top bit is SOP
input   [EobBits-1:0]   InEob;    // Top bit is EOP
input   [DataBits-1:0]  InDat;

// Decoded Header Values
output                  HdrValid [NoOfLookups -1:0];
output  [PartSize-1:0]  HdrValue [NoOfLookups -1:0];

// output data
output                  OutVal;
output  [SobBits-1:0]   OutSob;
output  [EobBits-1:0]   OutEob;
output  [DataBits-1:0]  OutDat;

);
{
// configuration parameter
////////////////////////////////////////////////////////////
// internal signals
////////////////////////////////////////////////////////////
signal    [Log2MaxHdrWords:0]    HdrWordCntr;

PROCESS (on rising edge of Clk)

IF Rst is high
        assign initial value to HdrValid
```

```
                assign initial value to HdrValid
                assign initial value to HdrValue
                assign initial value to HdrWordCntr
            // reset
        ELSE // get header word counter ticking
            IF InVal is high
                // EOP seen
                IF InEob is high
                    set HdrWordCntr to zero
                ELSE IF MaxHdrWords is not equal to MaxHdrWords
                    increment HdrWordCntr by one
            ENDIF // header extraction loop
            for lp = 0 to (NoOfLookups-1) increment lp by one //IF header word is reached and data is valid
                IF current word is valid header word
                    // issue valid word indication command
                    declare HdrValid[lp] valid
                    // adjust the data to start index
                    assign HdrValue[lp] to (InDat LEFTSHIFT StartIndex[lp])
                ENDIF
            ENDLOOP ENDIF // clock
ENDPROCESS // always // output assingment
OutVal = InVal;
OutSob = InSob;
OutEob = InEob;
OutDat = InDat;

}
```

APPENDIX L

```
// ----------------------------------------------------------------
// ----------------------------------------------------------------
// This file contains Match/Lookup Unit (MLU)
// ----------------------------------------------------------------
// ----------------------------------------------------------------
Object MLU
PARAMETERS   (
  FieldWidth              = 16;
  Log2FieldWidth          = 4;
  LookupAvaliable         = 0;
  LookupDepth             = 8;
  Log2LookupDepth         = 3;
  NoParallelLookup        = 0;
  Log2NoParallelLookup    = 1;
)
INTERFACES(
  // reset and clock
  input                               Rst;
  input                               Clk;
  // control signals
  input                               QEnable;
  input   [2:0]                       Opcode;
  input   [Log2FieldWidth:0]          Width;
  input   [FieldWidth-1:0]            Param1;
  input   [FieldWidth-1:0]            Param2;
  input                               LkWrEnb;
  input   [Log2LookupDepth-1:0]       LkWrAddr;
  input   [FieldWidth-1:0]            LkWrData;
  output  [FieldWidth-1:0]            LkWrRBData;

input   [31:0]                      SPReg_0;
  input   [31:0]                      SPReg_1;
  input   [31:0]                      SPReg_2;
  input   [31:0]                      SPReg_3;

// input check values
  input                               InVal;
  input   [FieldWidth-1:0]            InData;
  input   [FieldWidth-1:0]            InMask;
  // results
  output                              OutVal;
  output                              OutMatch;

);
(
// internal block generateion signal   [Log2LookupDepth-1:0]        LkRdAddr;
signal   [FieldWidth-1:0]             LkRdData;
signal   [FieldWidth-1:0]             iLkWrRBData;
signal                                LkInStart;
signal                                LkInProgress;
signal                                LnkProcessState;
constant                              Idle  = 1'b0;
constant                              Check = 1'b1;
```

```
// adjust the comparision to the width user requested

// The actual process
PROCESS (on rising edge of Clk)
    IF Rst is high
        assign reset values to OutVal
        assign reset values to OutMatch
        assign reset values to LkInStart
        assign reset values to LkInProgress
        assign reset values to LnkProcessState
    ELSE
        //default
        Clear OutVal & LkInStart // if the Match unit is enabled than try to do something
        IF QEnable is active high
            CASE (Opcode)
                3'd0 :  //   EQ:   Equal to Param1
                    IF InVal observed
                        OutVal      = 1;
                        OutMatch    = ((InData & InMask) == (Param1 & InMask));
                    ENDIF
                3'd1 :  //   LT:   Less Than Param1
                    IF InVal observed
                        OutVal      = 1;
                        OutMatch    = ((InData & InMask) < (Param1 & InMask));
                    ENDIF
                3'd2 :  //   LE:   Less Than or Equal to Param1
                    IF InVal observed
                        OutVal      = 1;
                        OutMatch    = ((InData & InMask) = (Param1 & InMask));
                    ENDIF
                3'd3 :  //   GT:   Greater Than Param1
                    IF InVal observed
                        OutVal      = 1;
                        OutMatch    = ((InData & InMask) > (Param1 & InMask));
                    ENDIF
                3'd4 :  //   GE:   Greater Than or Equal to Param1
                    IF InVal observed
                        OutVal      = 1;
                        OutMatch    = ((InData & InMask) >= (Param1 & InMask));
                    ENDIF
                3'd5 :  //   RNG:  Check if within range <Param1,Param2>
                    IF InVal observed
                        OutVal      = 1;
                        OutMatch    = ( ((InData & InMask) >= (Param1 & InMask)) && ((InData & InMask) = (Param2 & InMask)));
                    ENDIF
                3'd6 :  //   LUP:  Look up
                    IF InVal observed
                        IF LookupAvaliable is active
                            OutVal      = 1;
                            OutMatch    = 1;
```

```
                            // start lookup if the module is enabled for look
up
                        ELSE
                            LkInStart   = 1;
                        ENDIF
                    end
                3'd7:  //   EXTR: Extract
                    IF InVal observed
                        OutVal      = 1;
                        OutMatch    = 1;
                    ENDIF
                default :
                    IF InVal observed
                        OutVal      = 1;
                        OutMatch    = 1;
                    ENDIF
            ENDCASE
            //else jut return okay
            ELSE IF InVal observed
                OutVal      = 1;
                OutMatch    = 0;
            ENDIF

ENDIF
ENDPROCESS

}
```